United States Patent
Sanchez et al.

(10) Patent No.: US 11,099,612 B2
(45) Date of Patent: Aug. 24, 2021

(54) METHOD FOR FABRICATING AN APPARATUS OF A VARIABLE-TORQUE LAPTOP HINGE

(71) Applicant: Dell Products, LP, Round Rock, TX (US)

(72) Inventors: Anthony J. Sanchez, Pflugerville, TX (US); Laurent A. Regimbal, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/733,103

(22) Filed: Jan. 2, 2020

(65) Prior Publication Data
US 2021/0208639 A1    Jul. 8, 2021

(51) Int. Cl.
*E05D 11/08* (2006.01)
*G06F 1/16* (2006.01)

(52) U.S. Cl.
CPC ............ *G06F 1/1681* (2013.01); *E05D 11/08* (2013.01); *G06F 1/1616* (2013.01); *E05Y 2900/606* (2013.01)

(58) Field of Classification Search
CPC ............... G06F 1/1681; G06F 1/1616; E05Y 2900/606; E05Y 2201/26; H04M 1/0216; E05D 11/08; E05D 11/082; E05D 11/084; E05D 11/085; E05D 3/02; E05D 5/14; E05D 2005/145; F16C 11/04; Y10T 16/54038

See application file for complete search history.

(56) References Cited

U.S. PATENT DOCUMENTS

| 5,943,738 | A  | * | 8/1999  | Karfiol | E05D 11/082 16/342 |
| 6,230,365 | B1 | * | 5/2001  | Lu      | G06F 1/1616 16/16  |
| 6,470,532 | B2 | * | 10/2002 | Rude    | G06F 1/1616 16/313 |
| 6,584,646 | B2 | * | 7/2003  | Fujita  | G06F 1/1616 16/342 |

(Continued)

FOREIGN PATENT DOCUMENTS

| JP | 2003254323 A   | * | 9/2003 | |
| WO | WO-9514842 A1  | * | 6/1995 | ........... G06F 1/1681 |

*Primary Examiner* — Chuck Y Mah
(74) *Attorney, Agent, or Firm* — Prol Intellectual Property Law, PLLC; H. Kenneth Prol

(57) ABSTRACT

A variable torque opening hinge joint for a laptop may comprise a shaft having a protrusion along its axial length and operably connecting to a display chassis inserted through a first hinge joint and a second hinge joint that are operably connected to a base chassis. The first hinge joint may apply a constant torque resistive to a rotation of the shaft throughout a range of angular displacement, and the second hinge joint may apply a variable torque resistive to a rotation of the shaft that increases from a minimum variable resistive torque to a maximum variable resistive torque over a preset subset of the range of angular displacement to reach a maximum variable torque. A leading edge of the protrusion and a trailing edge of the protrusion may be separated by an angle equivalent to the preset subset of the range of angular displacement.

20 Claims, 15 Drawing Sheets

(56) References Cited

U.S. PATENT DOCUMENTS

| | | | | |
|---|---|---|---|---|
| 7,124,473 | B2* | 10/2006 | Lu | G06F 1/1616 |
| | | | | 16/342 |
| 9,483,084 | B2* | 11/2016 | Johnson | E05D 11/084 |
| 10,324,500 | B2* | 6/2019 | Schafer | E05D 11/06 |
| 10,871,016 | B2* | 12/2020 | Zhai | E05D 5/14 |
| 2005/0204509 | A1* | 9/2005 | Lin | G06F 1/1616 |
| | | | | 16/342 |
| 2007/0101543 | A1* | 5/2007 | Lu | G06F 1/1616 |
| | | | | 16/342 |
| 2008/0022492 | A1* | 1/2008 | Lee | E05D 11/02 |
| | | | | 16/337 |
| 2010/0064475 | A1* | 3/2010 | Wang | G06F 1/1616 |
| | | | | 16/232 |
| 2010/0088853 | A1* | 4/2010 | Degner | G06F 1/1679 |
| | | | | 16/342 |
| 2010/0139042 | A1* | 6/2010 | Chang | H04M 1/0216 |
| | | | | 16/297 |
| 2011/0239408 | A1* | 10/2011 | Chang | G06F 1/1681 |
| | | | | 16/386 |
| 2012/0204380 | A1* | 8/2012 | Chen | E05D 11/082 |
| | | | | 16/342 |
| 2012/0294670 | A1* | 11/2012 | Hsu | G06F 1/1681 |
| | | | | 403/116 |
| 2014/0007379 | A1* | 1/2014 | Yang | H04M 1/0249 |
| | | | | 16/277 |
| 2014/0059805 | A1* | 3/2014 | Krahn | G06F 1/1681 |
| | | | | 16/342 |
| 2016/0109909 | A1* | 4/2016 | Kim | G06F 1/1616 |
| | | | | 361/679.55 |
| 2017/0269639 | A1* | 9/2017 | Kim | G06F 1/1681 |

* cited by examiner

US 11,099,612 B2

METHOD FOR FABRICATING AN APPARATUS OF A VARIABLE-TORQUE LAPTOP HINGE

FIELD OF THE DISCLOSURE

The present disclosure generally relates to a hinge for a chassis of an information handling system. The present disclosure more specifically relates to fabrication of a variable torque hinge for operably connecting a base chassis to a display chassis.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may be housed, partially or wholly, within a base chassis and display chassis operably connected via one or more hinges.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
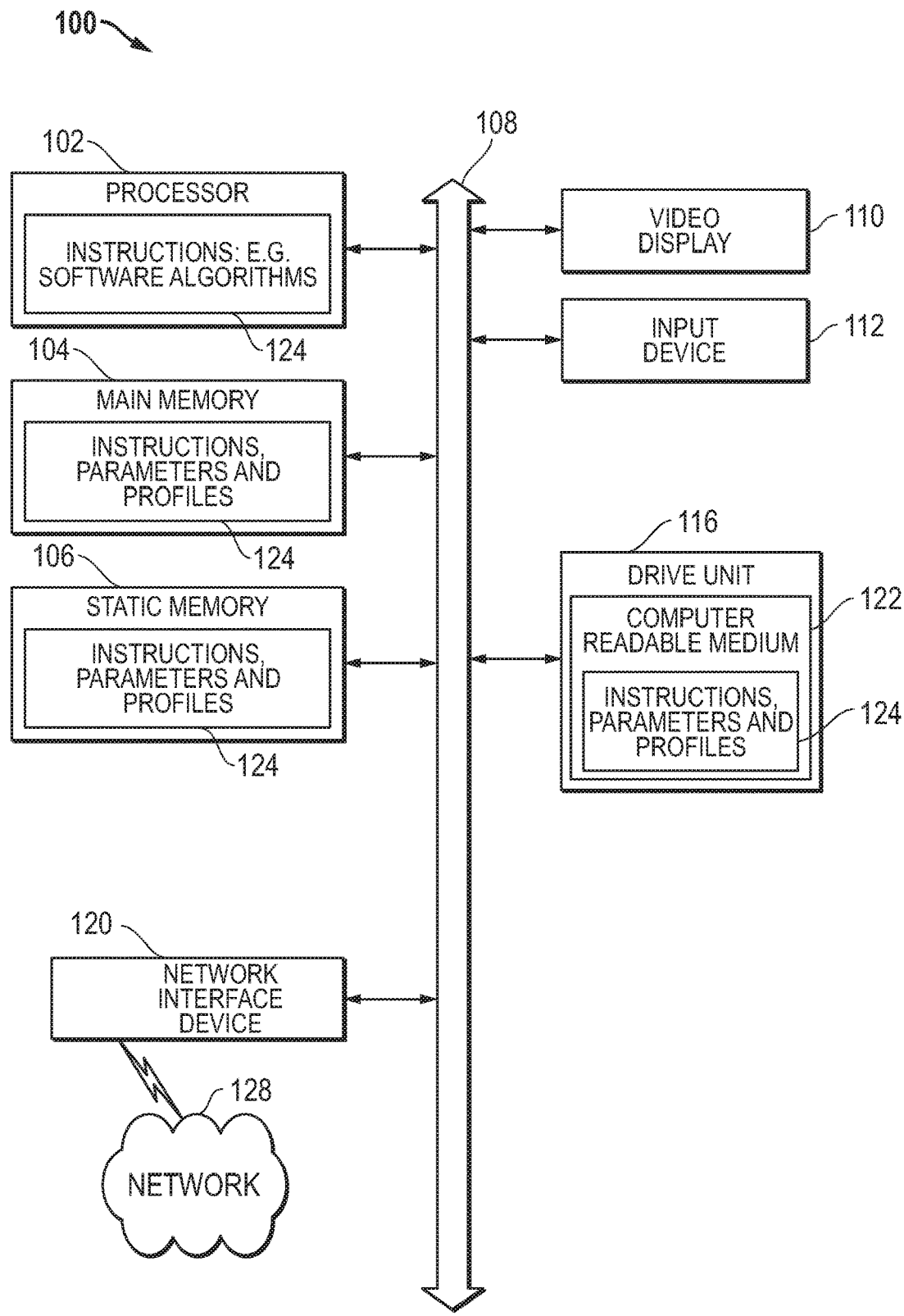
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The market for information handling systems prizes ease of mobility, driving manufacture of ever-lighter, slimmer chasses. Introduction of narrow bezel technology has improved product form factor by decreasing extension of the base chassis surface area outside the edges of the keyboard and touch pad. Prior to the advent of narrow bezel technology, base chassis surface area extending from the keyboard edges toward the display chassis may have been used to house components of hinges operably connecting the base housing to the display housing. Because such additional chassis surface area is no longer available or markedly decreased, smaller hinge components capable of fitting within the decreased available space of the base chassis are needed.

Previous designs operably connected the display chassis or housing to the base chassis or housing via a two friction element hinge. Such a two hinge may include first and second friction joints, each applying torques resistive to rotation of a shaft inserted within the friction joints. Each of these friction joints may exert torque resistive to rotation in either direction. However, the resistive torque applied by each of these friction joints may provide greater resistance to rotation in one direction than in another direction. For example, the first friction joint may provide torque resistive to clockwise and counterclockwise rotation of the shaft, but the torque supplied by the first friction joint that is resistive to clockwise rotation of the shaft may be greater than the torque supplied by the first friction joint that is resistive to counterclockwise rotation of the shaft. Such a first friction joint may be referred to herein as a constant torque opening joint if clockwise rotation of the shaft operates to open the laptop by pushing the display chassis away from the base chassis. As another example, the second friction joint may provide torque resistive to clockwise and counterclockwise rotation of the shaft, but the torque supplied by the second friction joint that is resistive to counterclockwise rotation of the shaft may be greater than the torque supplied by the second friction joint that is resistive to clockwise rotation of the shaft. Such a second friction joint may be referred to as a constant torque closing joint if counterclockwise rotation of the shaft operates to close the laptop by pushing the display chassis toward the base chassis.

The torque applied by the first friction joint that is resistive to clockwise rotation in such previous designs may be equivalent, lesser than, or greater than the torque applied by the second friction joint that is resistive to counterclockwise rotation. Thus, the force required to open the chasses in such existing designs may be the same or different from the force required to close the chasses. However, both these resistive torques in such previous systems may be constant throughout the majority of the allowable motion of the hinge. In other words, the force required to push the display chassis both away and toward the base chassis in these previous systems may remain constant throughout the almost all of the rotation of the display chassis with respect to the base chassis.

Current design requirements include the hinge operably connecting the display chassis and base chassis applying a resistive torque that varies as the display chassis rotates with respect to the base chassis. For example, design requirements may include a one-handed opening ability in which the display chassis may be rotated away from the base chassis with a single hand, without causing the base chassis to also lift off its supporting surface. In order to address this preference, a relatively low resistive torque applied by the hinge operably connecting the base chassis to the display chassis may be required. Application of such a low resistive torque may be needed only within a subset of the allowable rotation range between the display chassis and the base chassis. For example, the base chassis may be most likely to lift off its supporting surface (disallowing a one-handed user opening) when the display chassis is rotated with respect to the base chassis within a known range (e.g., 45 to 80 degrees). Thus, in order to allow for a one-handed user opening, a hinge capable of applying a relatively low resistive torque when rotated within the known range (e.g., 45 to 80 degrees) may be needed.

As another example, design requirements may include decrease or nearly eliminated play or wobble of both the display chassis and the base chassis with respect to one another throughout the allowable rotation of the display chassis with respect to the base chassis. In order to address this design requirement, a relatively higher resistive torque applied by the hinge may be needed within another subset of the allowable rotation range between the display chassis and the base chassis. For example, the display chassis may be most likely to wobble when the display chassis is oriented between roughly 90 and 120 degrees with respect to the base chassis. In order to disallow such unfavorable wobble, a hinge capable of applying the relatively higher resistive torque when rotated within the second known range (e.g., 90 to 120 degrees) may be needed. Thus, in order to meet each of these design requirements, a hinge capable of variable torque throughout the allowable rotation range is needed.

Embodiments of the present disclosure address this issue by employing a variable-torque hinge to operably connect the base chassis to the display chassis. Such variable-torque hinges in embodiments described herein may provide different resistive torques for specific subsets of rotational ranges, thus meeting each of the above-described design requirements. For example, a variable-torque hinge in embodiments described herein may apply a relatively lower, static resistive torque while the display chassis is rotated within a first subset of its range of rotation (e.g., 20 to 70 degrees) with respect to the base chassis, and a second relatively higher, resistive torque while the display chassis is rotated within a second subset of its range of rotation (e.g., 90 to 120 degrees). Such a variable resistive torque in some embodiments may be achieved by combining a constant torque joint and a variable torque joint that each apply resistive force in the same rotational direction (e.g., in the clockwise or counterclockwise direction) within a single hinge. In such a way, embodiments of the present disclosure may provide variable resistive force at different angles of rotation between the display chassis and the base chassis.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. In some embodiments, the processor 102 may be a graphics processing unit (GPU). Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a digital display 110. The digital display 110 in an embodiment may function as a liquid crystal display (LCD), an organic light emitting diode (OLED), a flat panel display, or a solid state display. Additionally, the information handling system 100 may include an input device 112, such as a keyboard, and/or a cursor control device, such as a mouse, touchpad, or gesture or touch screen input.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards. It is understood that other devices such as peripheral devices may be connected via wireless or wired connectivity as well according to various protocols described herein.

The disk drive unit 116 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. In a particular embodiment, the instructions, parameters, and profiles 124 may reside completely, or at least partially, within the main memory 104, the static memory 106, and/or within the disk drive 116 during execution by the processor 102 of information handling system 100. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
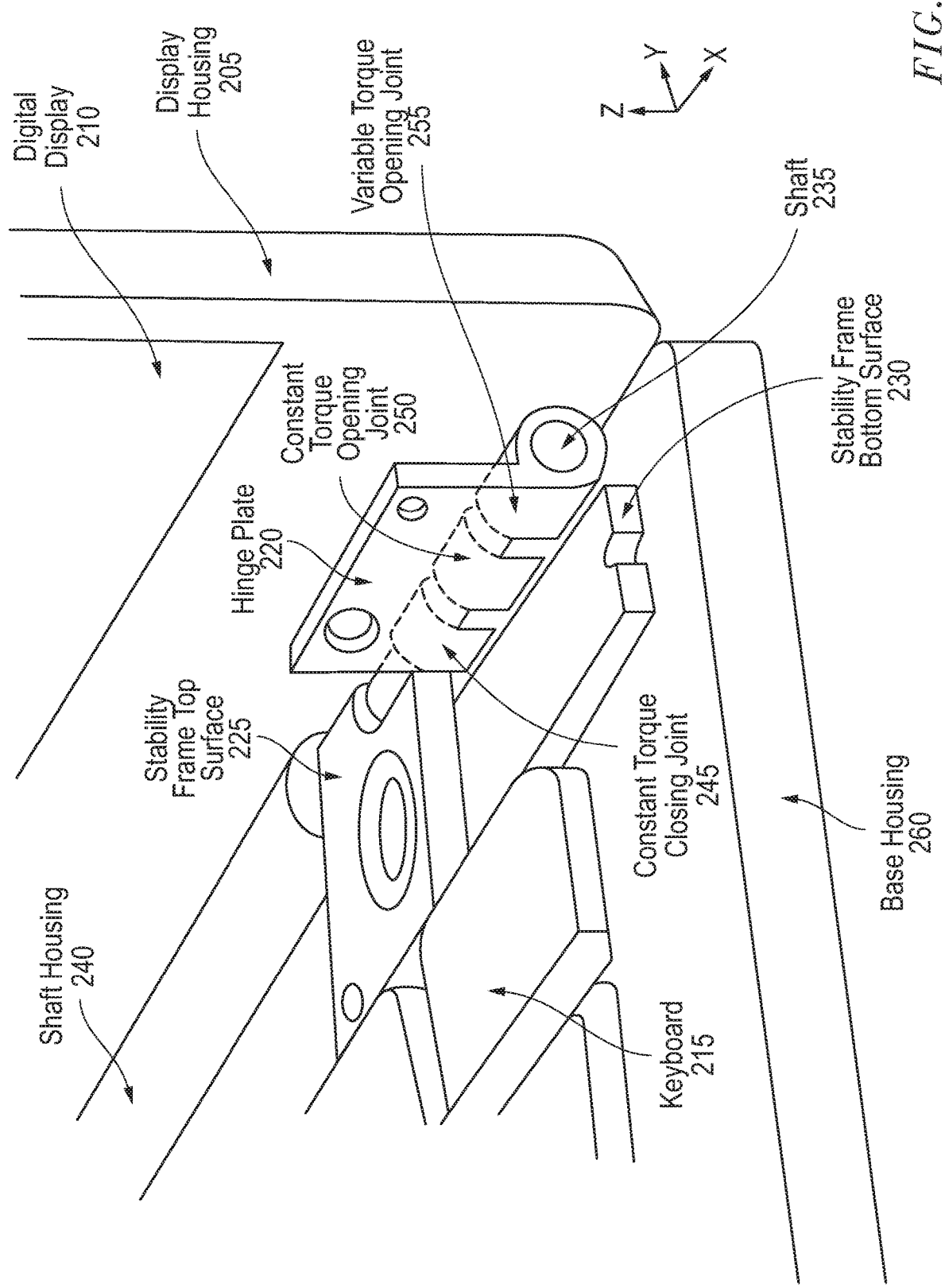
FIG. 2 is a graphical cut away view of a variable torque three-joint hinge according to an embodiment of the present disclosure.

FIG. 2 is a graphical cut away view of a variable torque three-joint hinge operably connecting a base housing that houses a keyboard to a display housing according to an embodiment of the present disclosure. The hinge illustrated in FIG. 2 illustrates a three joint friction element hinge where at least one of the three-joints is a constant torque hinge. As described herein, a constant torque hinge may operably connect a display chassis or housing 205 that houses a digital display 210 to a base chassis or housing 260 that houses a keyboard 215 via a three-joint friction element hinge.

Such a three-joint friction element hinge may include a base chassis hinge plate 220 operably attached or fixed to a stability frame having a top surface 225 and a bottom surface 230. The stability frame in such a system may provide a rigid structure to stabilize the base chassis hinge plate 220 to the base housing 260 as the display housing 205 rotates with respect to the base housing 260. The hinge plate 220 may be operably connected via at least three joints through which a shaft 235 may be inserted. For example, the shaft 235 may be inserted through a shaft housing 240, a constant torque closing joint 245, a constant torque opening joint 250, and a variable torque opening joint 255. The shaft 235 or the shaft housing 240 in an embodiment may be operably attached to a display chassis hinge plate 220, which may also be affixed to the display housing 205. As the shaft 235 or shaft housing 240 operably attached to the display chassis hinge plate 220 rotates in an embodiment, the display chassis hinge plate 220 may also rotate. Thus, rotation of the shaft 235 or the shaft housing 240 to which the display chassis hinge plate 220 is operably attached in an embodiment may cause a corresponding rotation of the display chassis hinge plate 220 with respect to the base chassis 260.

The constant torque closing joint 245, and the constant torque opening joint 250 in such a system may provide torques resistive to both clockwise and counterclockwise rotation of the shaft 235. The torque applied by the constant torque closing joint 245 in an embodiment that is resistive to counterclockwise rotation of the shaft 235 may be greater than the torque applied by the constant torque closing joint 245 that is resistive to clockwise rotation of the shaft 235. Thus, the constant torque closing joint 245 in an embodiment may provide a greater torque resistive to the counterclockwise motion required to move the display housing 205 toward the base housing 260, and thus close the chasses into a clamshell configuration. The torque applied by the constant torque opening joint 250 in an embodiment that is resistive to clockwise rotation of the shaft 235 may be greater than the torque applied by the constant torque opening joint 250 that is resistive to counterclockwise rotation of the shaft 235. Thus, the constant torque opening joint 250 in an embodiment may provide a greater torque resistive to the clockwise motion required to move the display housing 205 away from the base housing 260, and thus open the chasses into an open laptop configuration. The constant torque opening joint 250 and constant torque closing joint 245 in an embodiment may provide the same magnitude or differing magnitudes of resistive torque. For example, in some embodiments, the constant torque opening joint 250 may provide a resistive torque in the counterclockwise direction that is higher or lower than the resistive torque in the clockwise direction provided by the constant torque closing joint 245.

The variable torque opening joint 255 in an embodiment may provide a resistive torque that varies as the shaft 235 rotates in a clockwise motion required to move the display housing 205 away from the base housing 260 and toward an open laptop configuration. For example, the resistive torque supplied by the variable torque opening joint 255 in an embodiment may supply a resistive torque that increases from a minimum to a maximum resistive torque over a subset of angular displacement of the shaft 235 as it rotates within the constant torque closing joint 245, constant torque opening joint 250, and variable torque opening joint 255.

The constant torque opening joint 250, constant torque closing joint 245, and variable torque opening joint 255 in an embodiment may generate constant torque through one of several known mechanisms. For example, the constant torque opening joint 250, variable torque opening joint 255, or constant torque closing joint 245 may be Reell clip joints, in which a series of clips located within the joint (e.g., 245 or 250) fixedly attached to the display chassis 205 surround the shaft 235, which is fixedly attached to the hinge plate 220. In such an embodiment, as the interior clips (not shown) and display chassis 205 rotate with respect to the shaft 245 and hinge plate 220, interference or friction between the interior clips and the shaft 235 provides a resistive torque. As another example, the constant torque opening joint 250, variable torque opening joint 255, or constant torque closing joint 245 may include a friction disk, in which the shaft 235 is passed through a bracket, a wave spring, and a nut or press fit retainer located inside the joint (e.g., 245 or 250). In such an embodiment, torque may be generated, as the shaft 235 rotates, from compression of the wave spring between the bracket and the nut or press fit retainer.

As yet another example, the constant torque opening joint 250, variable torque opening joint 255, or constant torque closing joint 245 may take the form of a question mark band or roll pin fixedly attached to the hinge plate 220 through which the shaft 235 that is fixedly attached to the display housing 205 may be disposed. In such a system, torque may be generated through interferences between the inside diameter of the question mark band or roll pin and outside diameter of the shaft 235. In still another example, the constant torque opening joint 250, variable torque opening joint 255, or constant torque closing joint 245 may include a tapered shaft 235 disposed through a sleeve having a tapered inner diameter, and bracket within the joint (e.g., 245 or 250), both fixedly attached to the hinge plate 220, and through a nut fixedly attached to the display housing 205. In such an embodiment, as the display housing 205 and fixedly attached nut rotate with respect to the tapered sleeve, bracket, and hinge plate 220, the nut draws the tapered shaft 235 into the tapered sleeve, and the increased interference between the tapered shaft 235 and tapered sleeve generates friction or resistive torque.

Figure 3:
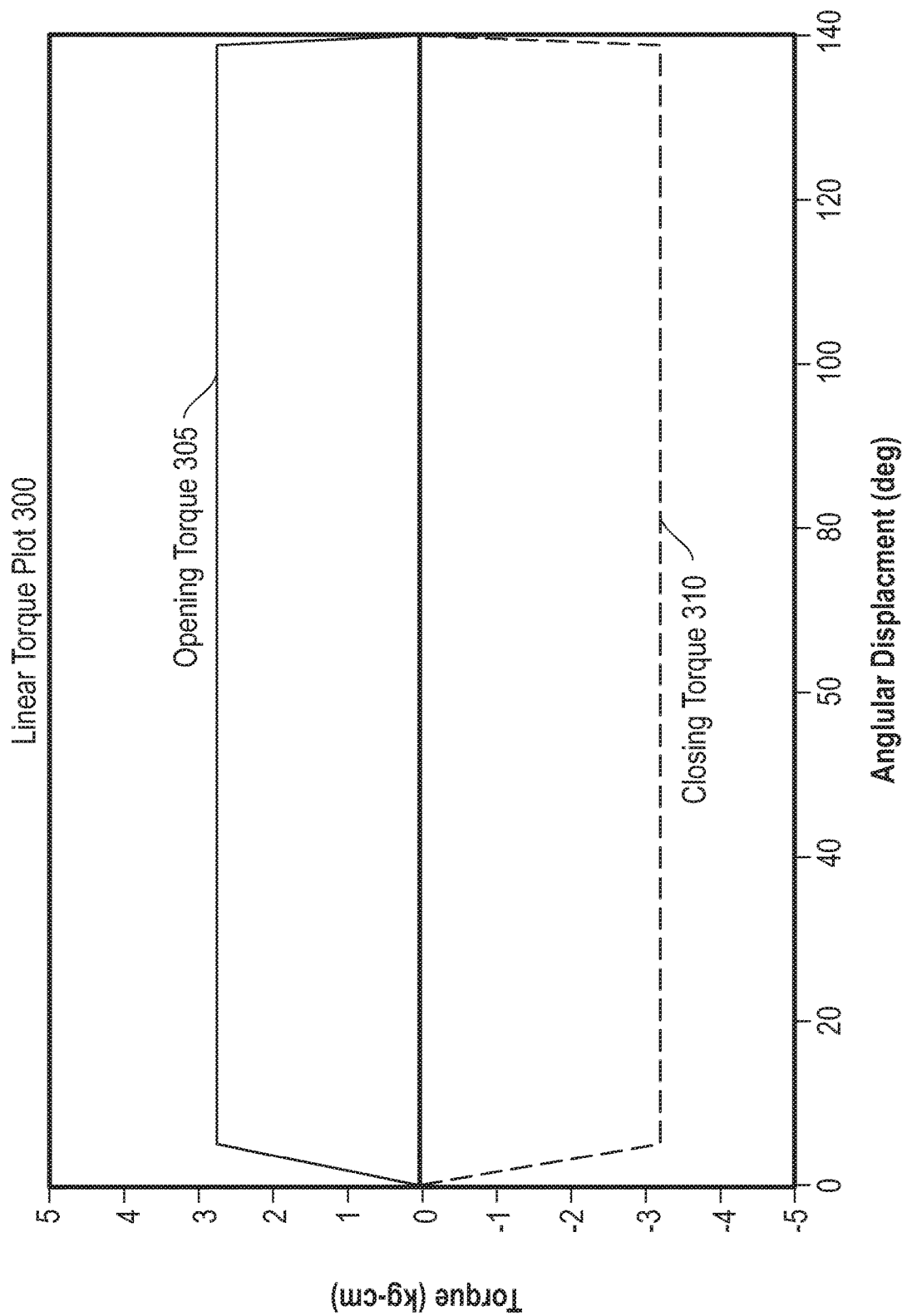
FIG. 3 is a plot illustrating a constant resistive torque of a constant torque two hinge according to an embodiment of the present disclosure.

FIG. 3 is a plot illustrating a constant resistive torque on opening and closing of a constant torque two hinge according to an embodiment of the present disclosure. A constant torque two-joint hinge may include a constant torque opening joint applying an opening resistive torque when the user attempts to push the display chassis away from the base chassis, and a constant torque closing joint applying a closing resistive torque when the user attempts to push the display chassis toward the base chassis.

The linear torque plot 300 illustrates the magnitude of such an opening resistive torque 305 and a closing resistive torque 310 with respect to a plurality of angular displacement measurements between the display chassis and the base chassis. As described herein, the opening resistive torque 305 in such previous designs may be equivalent, lesser than, or greater than the closing resistive torque 310. For example, as shown in the linear torque plot 300, the opening torque 305 may have a magnitude (in the counter-clockwise direction) of slightly less than 3 kg-cm at angular displacements above roughly five degrees, while the closing torque 310 may have a magnitude (in the clockwise direction) of slightly more than 3 kg-cm at angular displacements above roughly five degrees. Thus, the force required to open the chasses in such embodiments may be the same or different from the force required to close the chasses.

However, both the opening and closing resistive torques in such embodiments may be constant throughout most of the allowable motion of the hinge. For example, the opening torque 305 and the closing torque 310 maintain constant magnitudes between roughly five degrees and roughly 140 degrees of angular displacement in the linear torque plot 300. In other words, the force required to push the display chassis both away and toward the base chassis in these embodiments may remain constant throughout the majority of rotation of the display chassis with respect to the base chassis.

Figure 4A:
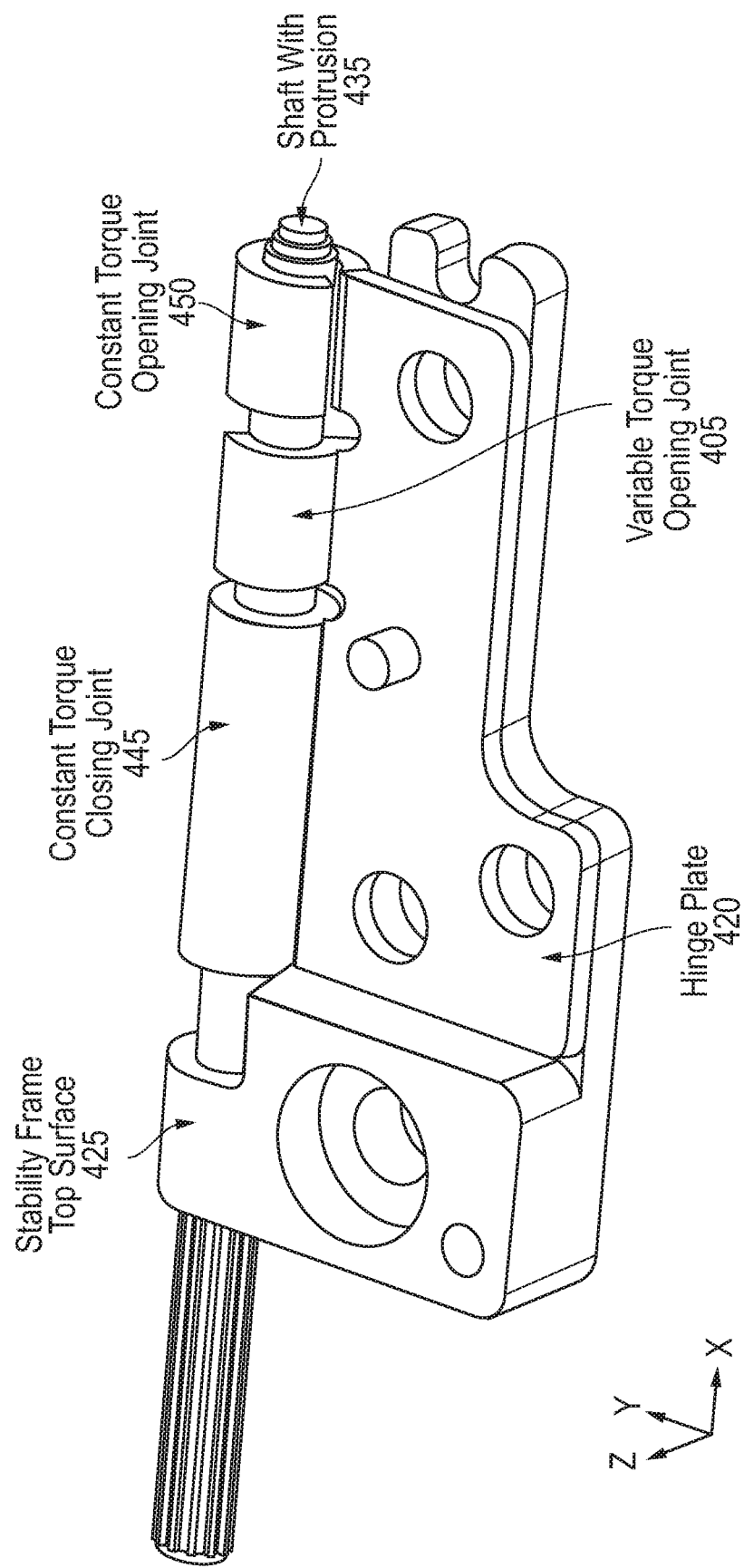
FIG. 4A is a graphical perspective-view illustrating a variable torque three joint hinge according to an embodiment of the present disclosure.

FIG. 4A is a graphical perspective-view illustrating the top surface of a variable torque three-coil hinge according to an embodiment of the present disclosure. As described herein, current design requirements include the hinge operably connecting the display chassis and base chassis applying a resistive torque that varies as the display chassis rotates with respect to the display chassis. For example, design requirements may include lower or absent wobble or play in the base housing and display housing, as well as a one-handed opening ability. In order to address this design requirement, a hinge capable of applying varying resistive torques at differing rotation angles may be needed. For example, a relatively low resistive torque applied by the hinge may be required for a first known range of rotation (e.g., 45 to 80 degrees) in which the base chassis may be most likely to lift off its supporting surface (disallowing a one-handed user opening). As another example, a relatively higher resistive torque applied by the hinge may be needed within another subset of the allowable rotation range (e.g., 90 to 120 degrees) in which the display chassis may be most likely to wobble.

Embodiments of the present disclosure address this issue by employing a variable-torque, opening joint 405. In an embodiment, a three joint hinge (e.g., the three joint hinge described with reference to FIG. 2) may include the variable-torque opening joint 405. In some embodiments, as shown in FIG. 4A, the variable torque opening joint 405 may be located between the constant torque closing joint 445 and the constant torque opening joint 450. In other embodiments, the variable torque opening joint 405 may be located adjacent to the stability frame top surface 425, or adjacent to the leading edge of shaft 435. In some embodiments, the variable torque opening joint 405 may be added to the constant torque joints 450 and 445 by fabricating the hinge plate 420 to comprise all three of joints 405, 445, and 450. In other words, the hinge plate 420, variable torque joint 405, constant torque opening joint 450, and constant torque closing joint 445 in such an embodiment may be fabricated from a single, solid, and continuous material. Each of 405, 450, and 445 may engage the shaft such that the shaft diameter is held by friction to 405, 450, and 445. This frictional engagement and the spring-like nature of 405, 450, and 445 require a degree of torque to overcome when opening and closing the information handling system base chassis and display chassis.

Such a variable-torque opening joint 405 in an embodiment may apply a variable torque that rises over a range of angular displacement between the base chassis and the display chassis. For example, the variable torque opening joint 405 in an embodiment may include inserting a shaft 435 through a question mark band that generates resistive torque through interferences between the inside diameter of the question mark band and outside diameter of the shaft 435. The cross-sectional dimensions of the shaft 435 and question mark band in such an embodiment may be designed such that no interference occurs between the inside diameter of the question mark band and outside diameter of the shaft 435 during a first subset of the rotational range of the shaft. In such an embodiment, the interference may also be designed to increase steadily over a second subset of the rotational range, such that the interference reaches a constant maximum magnitude over a third subset of the rotation range. For example, the shaft 435 may have a protrusion extending along its length, causing the shaft 435 to have an oblong or non-circular cross-sectional shape. This may be described in greater detail below with respect to FIGS. 5A-5D.

In other embodiments, the variable torque opening joint 405 may apply a constant torque, but only within a subset of the rotational range or range of angular displacement of the display chassis with respect to the base chassis. The combination of the resistive force applied by the constant torque opening joint 450 and the variable torque opening joint 405 in such other embodiments may provide a total resistive torque that varies over the rotational range or range of angular displacement. The variable torque opening joint 405 in such embodiments may generate torque through any known friction mechanism. For example, the variable torque opening joint 405 in alternative embodiments may include a Reell clip, a friction disk, a question mark band, a roll pin, or a tapered shaft/sleeve. In still other embodiments, other known mechanisms for generating friction to affect a resistive torque may be used.

The combination of the resistive torque generated by the constant torque opening joint 450 throughout the angular displacement between the base chassis and the display chassis and the resistive torque generated by the variable torque opening joint 405 within a subset of such an angular displacement in an embodiment may provide different resistive torques for specific subsets of rotational ranges, thus meeting each of the above-described design requirements. For example, the variable torque opening joint 405 in an embodiment may provide a constant, maximum torque resistive to rotation in an opening direction at angular displacements between 90 and 120 degrees. In such an embodiment, the combined resistive torques applied by the constant torque opening joint 450 and the variable torque opening joint 405 may be relatively higher than the torque applied by the constant torque opening joint 450, either alone or in combination with a variable torque applied by the variable torque opening joint 405 that is less than its maximum allowable resistive torque. This relatively higher combined torque may decrease or eliminate the tendency for the display chassis to wobble or have undesirable play with respect to the base chassis within the rotational range or angular displacement (e.g., 90 to 120 degrees) in which such wobble or play is most likely to occur.

As another example, the variable-torque opening joint 405 in an embodiment may provide little or no torque resistive to rotation in an opening direction at angular displacements below 80 degrees. In such an embodiment, only the constant torque opening joint 450 may provide torque resistive to rotation in an opening direction at angular displacements below 80 degrees. The resistive torque provided by the constant torque opening joint 450 alone in such an embodiment may be relatively lower than the combined resistive torque supplied by both the variable torque opening joint 405 and the constant torque opening joint 450 at angular displacements between 90 and 120 degrees. This relatively lower resistive torque applied at angular displacements in which the base chassis may be most likely to lift off its supporting surface (e.g., 45 to 80 degrees) may allow for a user to rotate the display chassis away from the base chassis (e.g., into an open configuration) using only one hand.

As described, the variable torque opening joint 405 in some embodiments may apply an increasing magnitude of resistive torque throughout a subset of the angular displacement of the display chassis with respect to the base chassis, leading up to application of its maximum resistive torque. Such an increase in torque applied by the variable torque opening joint 405 in an embodiment may gradually increase the total combined torque supplied by the variable torque opening joint 405 and the constant torque opening joint 450 up to a plateau of maximum torque. Such a gradual increase in torque may allow for a more fluid opening motion and avoid any jerking or jolting when transitioning the chassis from a closed to an open position.

Figure 4B:
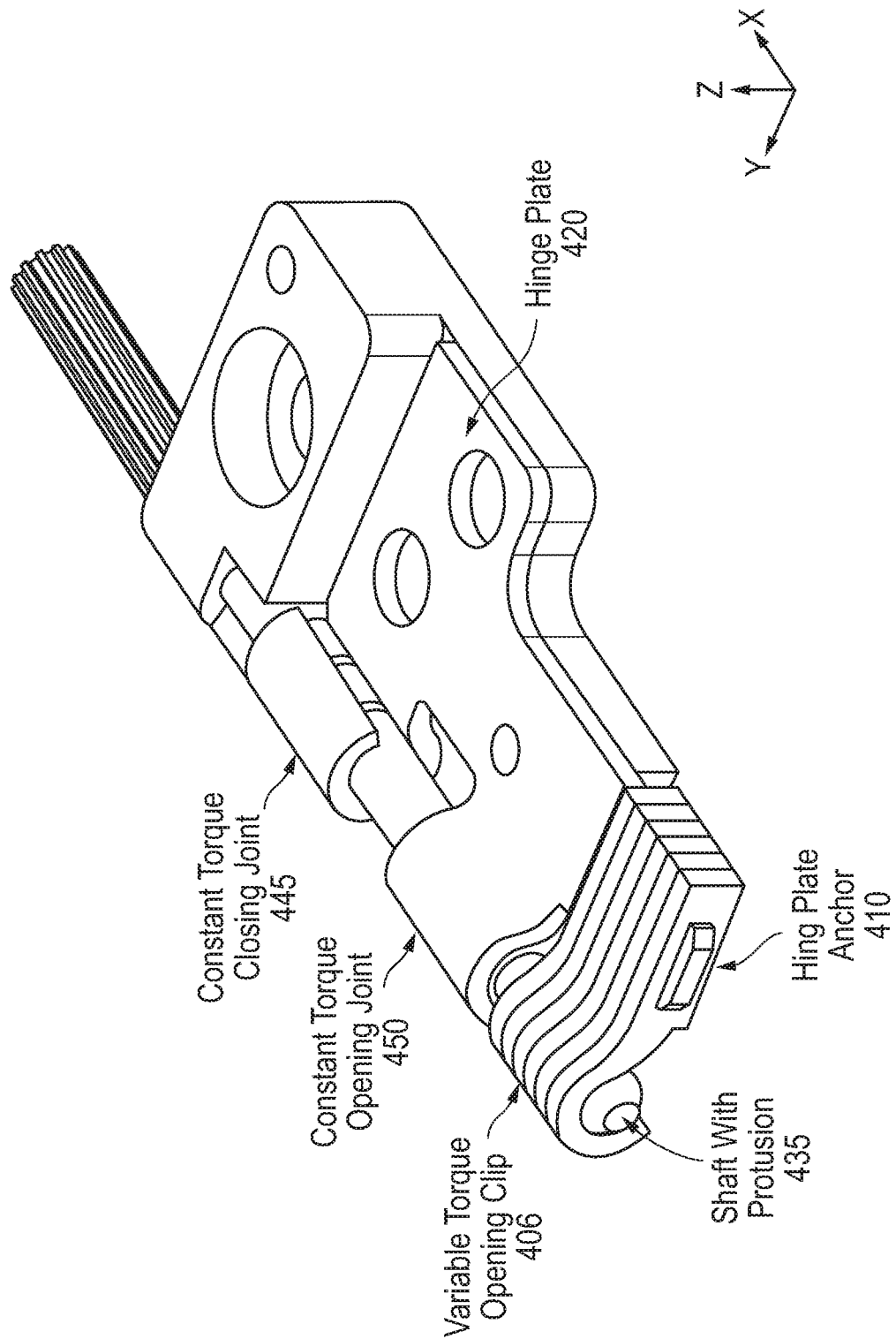
FIG. 4B is a graphical perspective-view of a variable torque three joint hinge including a variable torque opening clip according to an embodiment of the present disclosure.

FIG. 4B is a graphical perspective-view of a variable torque three-joint hinge including a constant torque opening joint and a variable torque opening clip according to an embodiment of the present disclosure. As described herein, the hinge plate 420, variable torque joint, constant torque opening joint 450, and constant torque closing joint 445 in some embodiments may be fabricated from a single, solid, and continuous material. In other embodiments, as illustrated in FIG. 4B, the variable torque joint may comprise a variable torque opening clip 406, which may be fixedly attached to the hinge plate 420 by inserting a hinge plate anchor 410 of hinge plate 420 through an opening in the variable torque opening clip 406. For example, in such an embodiment, the variable torque opening clip 406 may comprise one or more question-mark clip plates, each having an opening disposed throughout the thickness (in the X direction) of their shafts. Each of these one or more plates may be separately machine-pressed, aligned with one another, stacked, and affixed to one another to form the variable torque opening clip 406.

The hinge plate 420 in such an embodiment may be fabricated to include an anchor 410 protruding beyond the leading edge of the constant torque opening joint 450 in the negative X direction. Upon fabrication of the variable torque opening clip 406 (e.g., following joining of the plurality of question-mark clip plates) in such an embodiment, the hinge plate anchor 410 may be inserted through the shaft openings formed in each of the plurality of stacked question-mark clip plates forming the variable torque opening clip 406. In some embodiments, the hinge plate anchor 410 may also be bonded, glued, screwed, or otherwise fixedly attached to the variable torque opening clip 406. Similarly, in some embodiments, the plurality of stacked question-mark clip plates may also be bonded, glued, screwed, or otherwise fixedly attached to one another. The hinge plate 420 and variable torque opening clip 406 in such an embodiment may be comprised of the same or differing materials. The shaft 435 may be inserted through the constant torque closing joint 445, constant torque opening joint 450, and variable torque opening clip 406 in an embodiment.

Figure 4C:
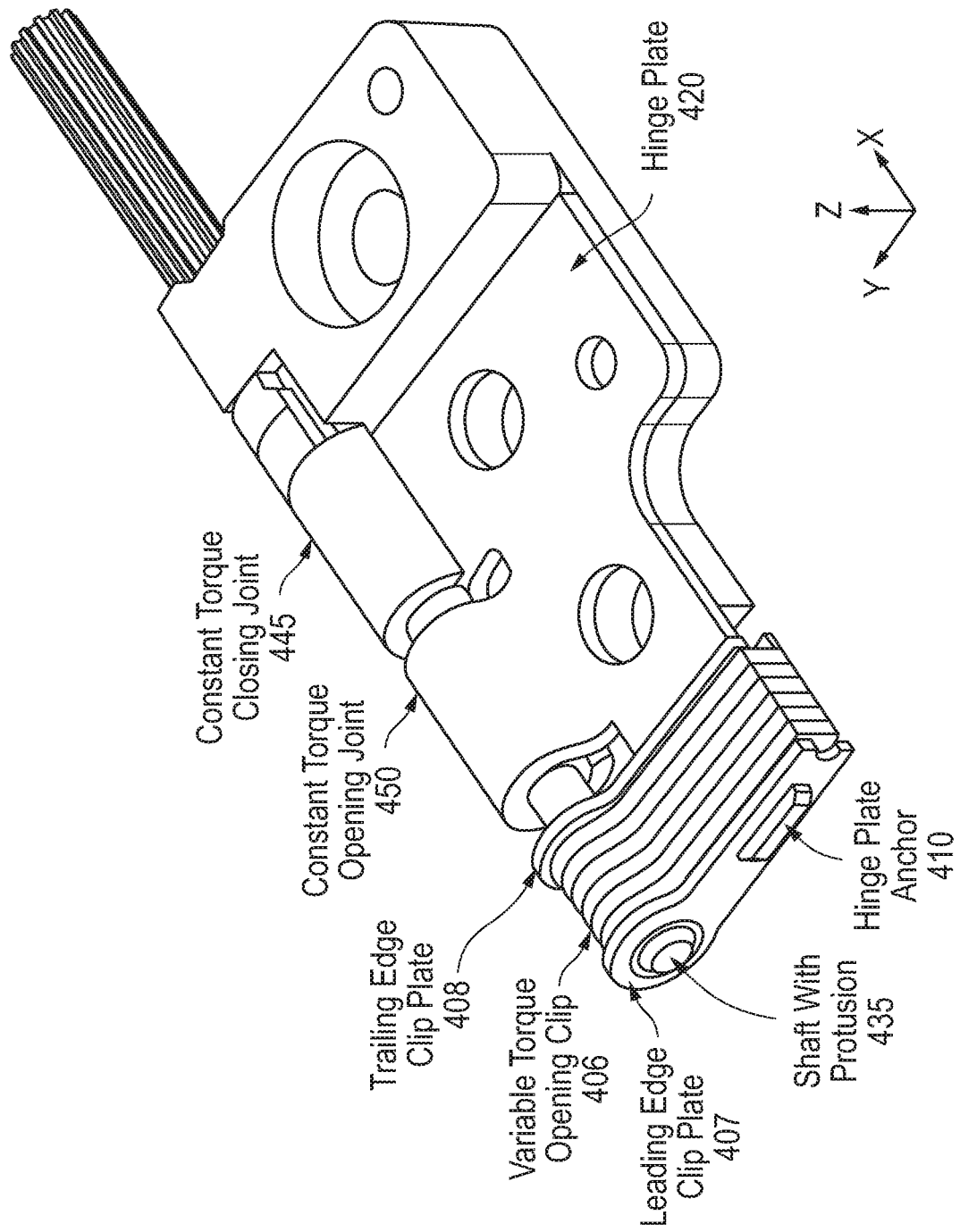
FIG. 4C is a graphical perspective-view of a variable torque three-joint hinge including a plated variable torque opening clip according to an embodiment of the present disclosure.

FIG. 4C is a graphical perspective-view of a variable torque three-joint hinge including a constant torque opening joint and a plated variable torque opening clip according to an embodiment of the present disclosure. In some embodiments, in which the variable torque opening clip 406 is comprised of stacked question-mark clip plates, the clip 406 may further include one or more end plates. For example, as illustrated in FIG. 4C, the variable torque opening clip 406 may be capped on either end by a leading edge clip plate 407 or a trailing edge clip plate 408. The hinge plate 420, leading edge clip plate 407, trailing edge clip plate 408, and variable torque opening clip 406 in such an embodiment may be comprised of the same or differing materials. Addition of the leading edge clip plate 407 or trailing edge clip plate 408 in such an embodiment may operate to decrease play between the variable torque opening clip 406 and the hinge plate anchor 410 during operation, or to increase stiffness (and thus resistive torque) supplied by the variable torque opening clip 406. The shaft 435 may be inserted through the constant torque closing joint 445, constant torque opening joint 450, and variable torque opening clip 406 in an embodiment.

Figure 5A:
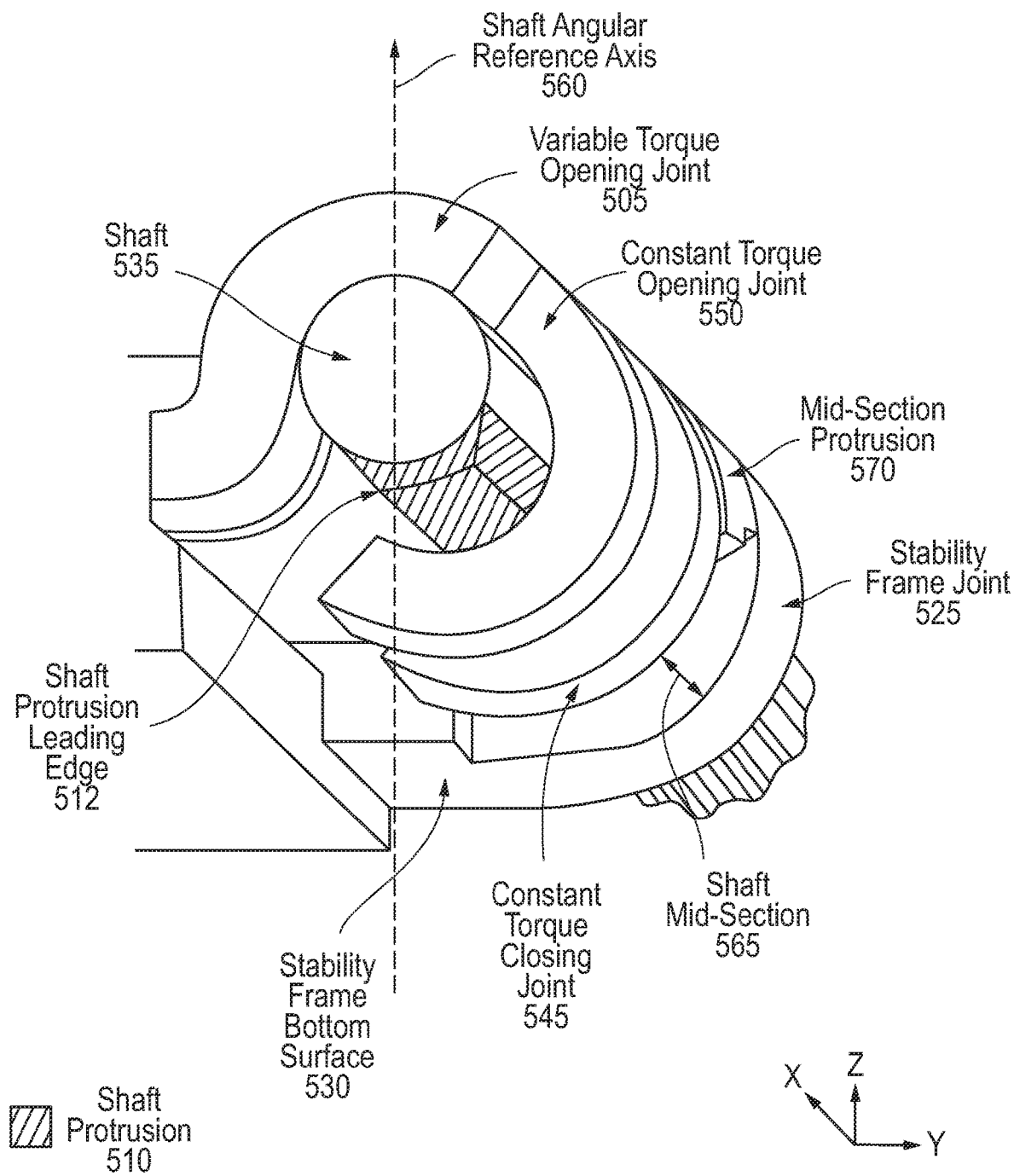
FIG. 5A is a graphical perspective-view of a variable torque hinge in a first rotational position according to an embodiment of the present disclosure.

FIG. 5A is a graphical perspective-view of a variable torque hinge including a variable torque opening joint 505, a constant torque opening joint 550, and a constant torque closing joint 545 in a first rotational position according to an embodiment of the present disclosure. As described herein, the variable torque opening joint 550 in an embodiment may include a question mark band through which a shaft 535 may be inserted. The question mark band that comprises the variable torque opening joint 550 in such an embodiment may generate resistive torque as portions of the shaft 535 exterior surface rotate against the variable torque opening joint 550 interior surface. In an embodiment, a two-joint hinge may be supplemented with the variable-torque opening joint 505. In some embodiments, as shown in FIG. 4A, the variable torque opening joint 405 may be located between the constant torque closing joint 445 and the constant torque opening joint 450. In other embodiments, as shown in FIG. 5A, the variable torque opening joint 505 may be located adjacent to the leading edge of shaft 535, such that the constant torque opening joint 550 is adjacent the constant torque closing joint 545. In still other embodiments, the variable torque opening joint 505 may be located adjacent to the stability frame joint 525.

The cross-sectional dimensions of the leading edge of the shaft 535 and question mark band that forms the variable torque opening joint 550 in such an embodiment may be designed such that the interference between the exterior surface of the shaft 535 and interior surface of the variable torque opening joint 550 is relatively higher or lower at certain angular displacements or rotational positions of the shaft with respect to the variable torque opening joint 550. The shaft 535 in an embodiment may include a circular core having a cross-sectional diameter that is equal to or lesser than the radius of the interior surface of the variable torque opening joint 505. At least a portion of the shaft 535 in an embodiment may include an exterior protrusion 510 extending axially (with respect to the joints 505, 545, and 550) from a portion of the shaft 535 disposed through the variable torque opening joint 505, and toward the constant torque opening joint 550. The addition of the protrusion 510 to the exterior cross-sectional circumference of the shaft 535 in an embodiment may give the portion of the shaft 535 inserted through the variable torque opening joint 505 a non-circular cross-sectional shape. In some embodiments, the protrusion 510 may extend further axially down the shaft 535, including portions of the shaft inserted through one or both of the constant torque opening joint 550 or the constant torque closing joint 545.

FIG. 5A may depict a minimum resistive torque position for the shaft 535 with respect to the variable torque opening joint 505 in an embodiment. As described herein, resistive torque may be supplied by the variable torque opening joint 505 as the interior surface of the variable torque opening joint 505 comes into contact with the exterior surfaces of the shaft 535, creating friction. The distance between the center of the shaft 535 circular core and the exterior surface of the shaft protrusion 510 in an embodiment may be greater than the radius of the variable torque opening joint 505 interior surface. In other words, rotation of the shaft 535 from the position depicted in FIG. 5A that causes the shaft protrusion 510 to come into contact with the interior surface of the variable torque opening joint 505 in an embodiment may cause corresponding friction between the exterior surface of the shaft protrusion 510 and the interior surface of the variable torque opening joint 505. In some embodiments, such contact between the shaft protrusion 510 and the variable torque opening joint 505 may also cause deformation in the shape of the variable torque opening joint 505 to allow for such rotation. In contrast, because the radius of the shaft 535 central core (portion that does not include the shaft protrusion 510) may be smaller than the radius of the variable torque opening joint 505 interior surface, little or no friction or deformation may result from rotation within the variable torque opening joint 505 of the portion of the shaft 535 that does not include the protrusion 510. The shaft 535 may be said to be in a "neutral" angular displacement when little or no such friction or deformation is occurring.

FIG. 5A depicts the shaft 535 placed in such a neutral angular displacement, where no portion of the shaft protrusion 510 is in contact with the interior surface of the variable torque opening joint 505. The shaft 535 in an embodiment may be in such a neutral angular displacement position, for example, when the laptop is placed in a closed configuration. As disclosed herein, the variable torque opening joint 535 may operate to slowly increase torque resistive to rotation of the display chassis toward an open laptop configuration over a preset range of angular displacements (e.g., between 70 and 110 degrees). Such a resistive torque in an embodiment may begin to increase as the leading edge 512 of the shaft protrusion 510 comes into contact with the interior surface of the variable torque opening joint 505. The angular displacement of the shaft 535 at which such contact occurs may be referred to herein as the torque ramp initializing angular displacement. For example, in an embodiment in which the variable torque opening joint 535 increases resistive torque as the shaft 535 (and thus the display chassis) rotates from a 70 degree angle (with respect to the base chassis) to a 110 degree angle, the torque ramp initializing angular displacement may be 70 degrees.

Design specifications may require that the variable torque opening joint 505 in an embodiment provide little or no resistive torque when the display chassis (and thus shaft 535) are rotating between zero degrees (e.g., a closed laptop configuration) and the torque ramp initializing angular displacement. Thus, design specifications may require no contact between the shaft protrusion 510 and the interior surface of the variable torque opening joint 505 when the shaft 535 is rotated between its neutral position (e.g., closed laptop configuration), and the torque ramp initializing angular displacement (e.g., 70 degrees). Consequently, the shaft 535 may be placed in its neutral position when the leading edge 512 of the shaft protrusion 510 is rotated away from the interior surface of the variable torque opening joint 505 that is equivalent to the torque ramp initializing angular displacement (e.g., 70 degrees). The shaft angular reference axis 560 in an embodiment may represent a reference rotational position of the shaft 535 with respect to the variable torque opening joint 505 when the shaft 535 is in such a neutral position. In an embodiment, the shaft angular reference axis 560 may transect the center of the circular core of the shaft 535 and the cross-sectional leading edge 512 of the shaft protrusion 510.

The shaft may also have a mid-section 565 situated between the constant torque closing joint 545 and the stability frame joint 525 along the rotational axis of the shaft 535 in some embodiments. The portion of the shaft 535 disposed between the constant torque closing joint 545 and the stability frame joint 525 (e.g., within the shaft mid-section 565) in an embodiment may include a protrusion 570 acting as a notch. Such a protrusion 570 or notch in an embodiment may come into contact with the stability frame bottom surface 530, impeding rotation of the shaft 535 beyond a maximum angular displacement, as described in greater detail with reference to FIG. 5D.

Figure 5B:
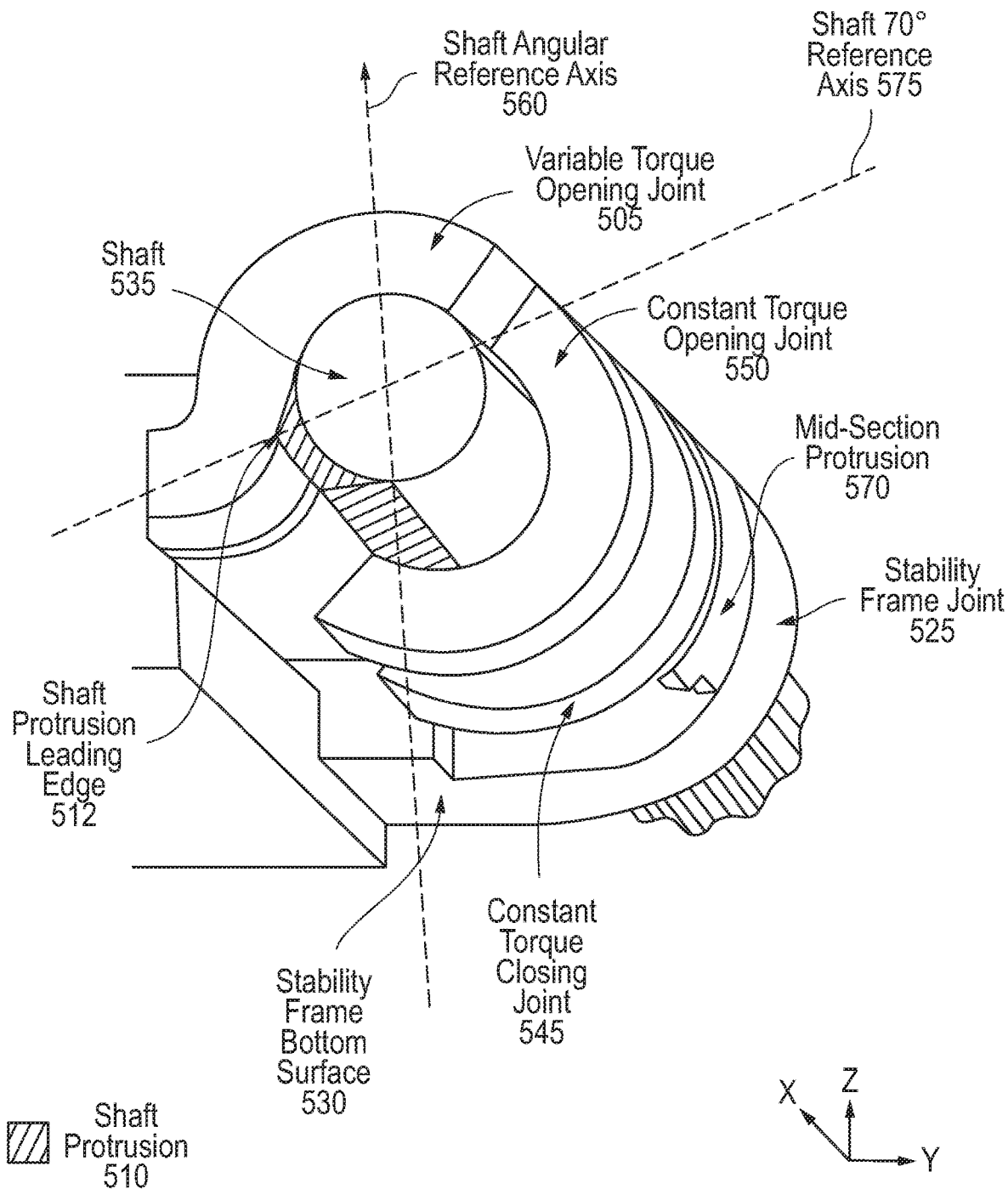
FIG. 5B is a graphical perspective-view of a variable torque hinge in a second rotational position according to an embodiment of the present disclosure.

FIG. 5B is a graphical perspective-view of a variable torque hinge including a variable torque opening joint 505, constant torque opening joint 550, and constant torque closing joint 545 in a second rotational position according to an embodiment of the present disclosure. As shown in FIG. 5B, the shaft 535 may be rotated clockwise into a second rotational position in which the leading edge 512 of the shaft protrusion 510 makes contact with the interior surface of the variable torque opening joint 505. As described herein, such rotation of the shaft 535 and corresponding contact between the shaft protrusion 510 and the interior surface of the variable torque opening joint 505 in an embodiment may cause friction or deformation in the shape of the variable torque opening joint 505. This friction or deformation may cause a corresponding increase in torque resistive to further rotation of the shaft 535, and thus to rotation of the display chassis away from the base chassis and toward an open laptop configuration. As the shaft 535 rotates in such a clockwise direction, the shaft mid-section protrusion 570 may also rotate clockwise, toward the bottom surface of the stability frame 530.

The shaft 535 is depicted in FIG. 5B at the torque ramp initializing angular displacement. As described herein, the angular displacement of the shaft 535 with respect to the shaft angular reference axis 560 (representing the neutral position of the shaft 535 at a rotation of zero degrees or in a closed laptop configuration) necessary to place the leading edge 512 of the shaft protrusion 510 in contact with the variable torque opening joint 505 interior surface may be equivalent to the torque ramp initializing angular displacement preset according to design specifications. For example, in an embodiment in which the variable torque opening joint 535 increases resistive torque as the shaft 535 (and thus the display chassis) rotates from a 70 degree angle (with respect to the base chassis) to a 110 degree angle, according to design specifications, the torque ramp initializing angular displacement may be 70 degrees. Thus, the shaft 70 degree reference axis 575 transecting the center of the circular core of the shaft 535 and the leading edge 512 of the shaft protrusion 510 when the shaft 535 is rotated to the torque ramp initializing angular displacement may be oriented at a 70 degree angle with respect to the shaft angular reference axis 560. In other embodiments, the torque ramp initializing angular displacement may have a value other than 70 degrees. In such a scenario, the reference axis 575 may be oriented at an angle with respect to the shaft angular reference axis 560 that is equivalent to this other torque ramp initializing angular displacement (e.g., not 70 degrees).

Design specifications may require that the variable torque opening joint 505 in an embodiment provide little or no resistive torque when the display chassis (and thus shaft 535) are rotating between zero degrees (e.g., a closed laptop configuration) and the torque ramp initializing angular displacement. Thus, design specifications may require no contact between the shaft protrusion 510 and the interior surface of the variable torque opening joint 505 when the shaft 535 is rotated between its neutral position (e.g., closed laptop configuration), and the torque ramp initializing angular displacement (e.g., 70 degrees). Consequently, the shaft 535 may be placed in its neutral position when the leading edge 512 of the shaft protrusion 510 is rotated away from the interior surface of the variable torque opening joint 505 that is equivalent to the torque ramp initializing angular displacement (e.g., 70 degrees). The shaft angular reference axis 560 in an embodiment may represent a reference rotational position of the shaft 535 with respect to the variable torque opening joint 505 when the shaft 535 is in such a neutral position. In an embodiment, the shaft angular reference axis 560 may transect the center of the circular core of the shaft 535 and the cross-sectional leading edge 512 of the shaft protrusion 510.

The shaft 535 or the shaft protrusion 510 in an embodiment may come into contact with the interior surfaces of one or both of the constant torque opening joint 550 or the constant torque closing joint 545 prior to contact being made between the leading edge 512 of the protrusion 510 and the interior surface of the variable torque opening joint 505. In other words, as the shaft 535 rotates from its neutral position toward the torque ramp initializing angular displacement (e.g., 70 degrees) or vice versa, friction between the shaft 535 or protrusion 510 and the interior surfaces of the constant torque opening joint 550 or the constant torque closing joint 545 may apply a constant resistive torque. This constant resistive torque may apply in addition to or in the absence of variable resistive torque applied by the variable torque opening joint 505 in an embodiment.

Figure 5C:
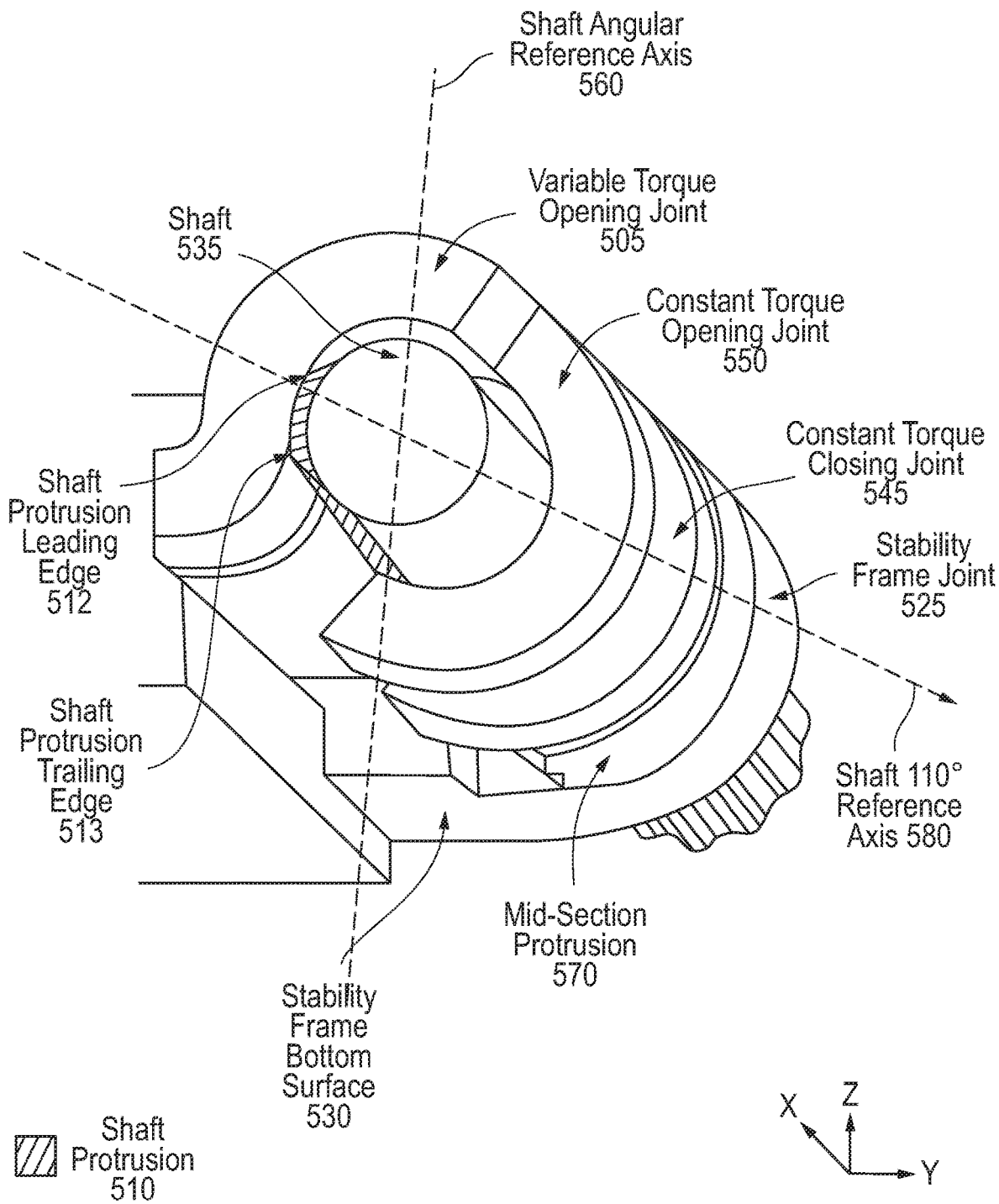
FIG. 5C is a graphical perspective-view of a variable torque hinge in a third rotational position according to an embodiment of the present disclosure.

FIG. 5C is a graphical perspective-view of a variable torque hinge including a variable torque opening joint and a constant torque opening joint in a third rotational position according to an embodiment of the present disclosure. As shown in FIG. 5C, the shaft 535 may be rotated clockwise into a third rotational position in which the entire exterior surface of the shaft protrusion 510 makes contact with the interior surface of the variable torque opening joint 505. As described herein, such rotation of the shaft 535 and corresponding increasing contact between the shaft protrusion 510 and the interior surface of the variable torque opening joint 505 in an embodiment may cause friction or deformation in the shape of the variable torque opening joint 505, and a corresponding increase in torque resistive to further rotation of the shaft 535. As the shaft 535 rotates in such a clockwise direction, the shaft mid-section protrusion 570 may also rotate clockwise, closer toward the bottom surface of the stability frame 530.

The shaft 535 is depicted in FIG. 5B at a torque plateau angular displacement, which may describe the angular displacement of the shaft 535 associated with a maximum resistive torque being applied by the variable torque opening joint 505. The resistive torque applied by the variable torque opening joint 505 in an embodiment may increase as the contact between the shaft protrusion 510 and the variable torque opening joint 505 interior surface also increases, due to friction or deformation of the variable torque opening joint 505. Such resistive torque applied by the variable torque opening joint 505 in an embodiment may reach a maximum when the entire exterior surface of the shaft protrusion 510 is in contact with the interior surface of the variable torque opening joint 505. This may occur when a trailing edge 513 of the shaft protrusion 510 comes into contact with the interior surface of the variable torque opening joint 505 in an embodiment.

The shaft 535 may be oriented at an angle equivalent to the torque plateau angular displacement, preset according to design specifications (e.g., 110 degrees), with respect to its neutral position when the entire surface of the shaft protrusion 510, and the trailing edge 513 first makes contact with the interior surface of the variable torque opening joint 505. For example, in an embodiment in which the variable torque opening joint 535 increases resistive torque as the shaft 535 (and thus the display chassis) rotates from a 70 degree angle (with respect to the base chassis) to a 110 degree angle, according to design specifications, the maximum angular displacement may be 110 degrees. Thus, the shaft 110 degree reference axis 580 transecting the center of the circular core of the shaft 535 and the leading edge 512 of the shaft protrusion 510 when the shaft 535 is rotated to the torque plateau angular displacement may be oriented at a 110 degree angle with respect to the shaft angular reference axis 560. In other embodiments, the torque plateau angular displacement may have a value other than 70 degrees. In such a scenario, the reference axis 580 may be oriented at an angle with respect to the shaft angular reference axis 560 that is equivalent to this other torque ramp initializing angular displacement (e.g., not 110 degrees).

The shaft 535 or the shaft protrusion 510 in an embodiment may come into contact with the interior surfaces of one or both of the constant torque opening joint 550 or the constant torque closing joint 545 while contact is being made between the protrusion 510 and the interior surface of the variable torque opening joint 505. In other words, as the shaft 535 rotates from the torque ramp initializing angular displacement (e.g., 70 degrees) to the torque plateau angular displacement (e.g., 110 degrees) or vice versa, friction between the shaft 535 or protrusion 510 and the interior surfaces of the constant torque opening joint 550 or the constant torque closing joint 545 may apply a constant resistive torque. This constant resistive torque may apply in addition to variable resistive torque applied by the variable torque opening joint 505 in an embodiment as the shaft rotates between the torque ramp initializing angular displacement and the torque plateau angular displacement.

Figure 5D:
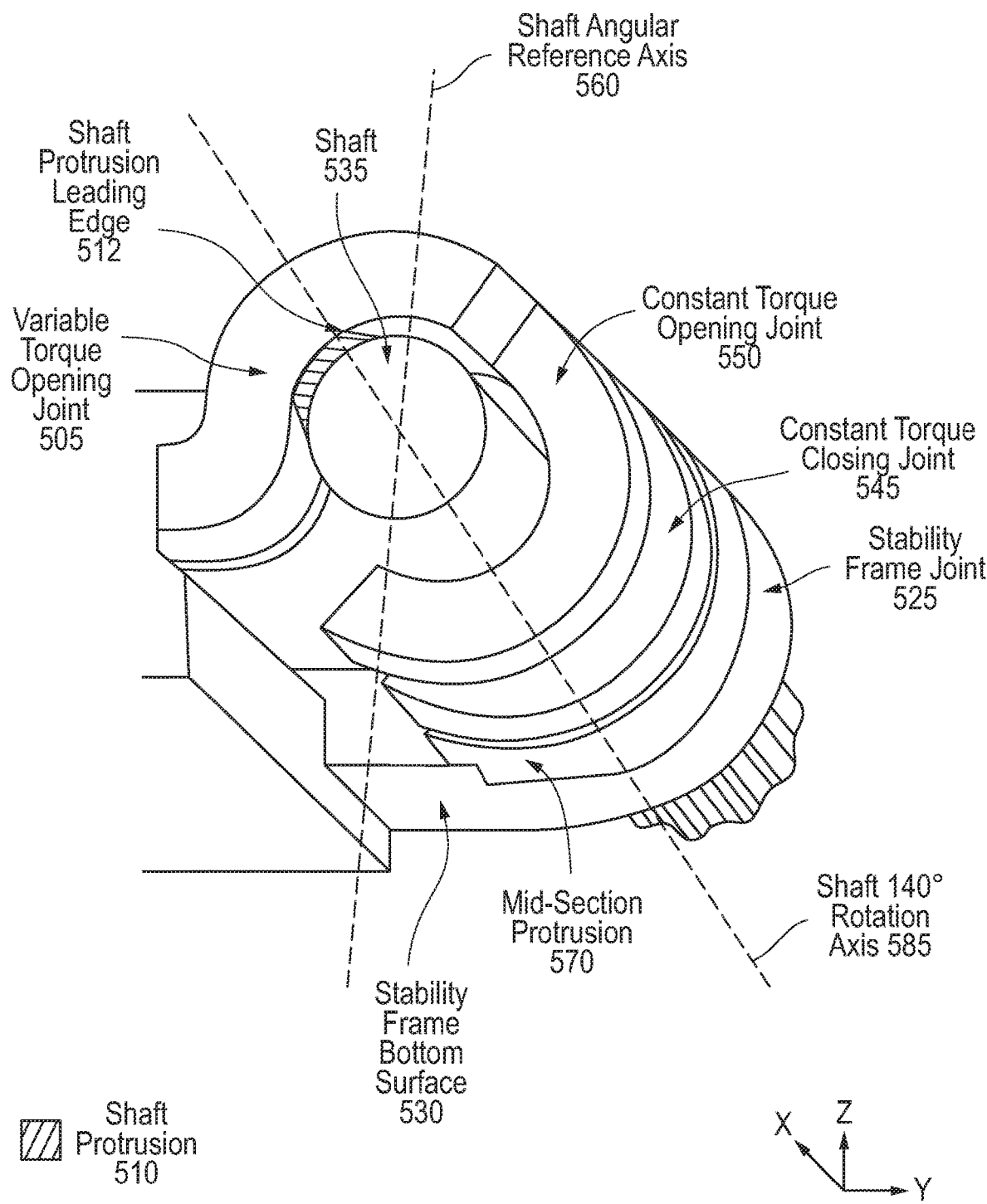
FIG. 5D is a graphical perspective-view of a variable torque hinge in a fourth rotational position according to an embodiment of the present disclosure.

FIG. 5D is a graphical perspective-view of a variable torque hinge including a variable torque opening joint and a constant torque opening joint in a fourth rotational position according to an embodiment of the present disclosure. Design specifications may require the combined resistive torque supplied by the variable torque opening joint 505, constant torque opening joint 550, and constant torque closing joint to impeded rotation of the display chassis with respect to the base chassis beyond a preset maximum angular displacement. For example, design specifications may require a method for impeding rotation of the display chassis more than 140 degrees away from the base chassis. In other embodiments, this maximum allowable angular displacement may have other values, as preset according to design specifications.

Contact between the mid-section protrusion 570 and the stability frame bottom surface 530 may impede further rotation of the shaft 535 in accordance with these preset design specification requirements in an embodiment. For example, when the shaft 535 is rotated 140 degrees away from its neutral position (e.g., closed laptop configuration), as depicted by the 140 angle between the shaft angular reference axis 560 and the shaft 140 degree rotation axis 585, the mid-section protrusion 570 may make contact with the stability frame bottom surface 530. In such an embodiment, such contact may impede further clockwise rotation of the shaft 535 with respect to the variable torque opening joint 505, constant torque opening joint 550, or constant torque closing joint 545.

Figure 6:
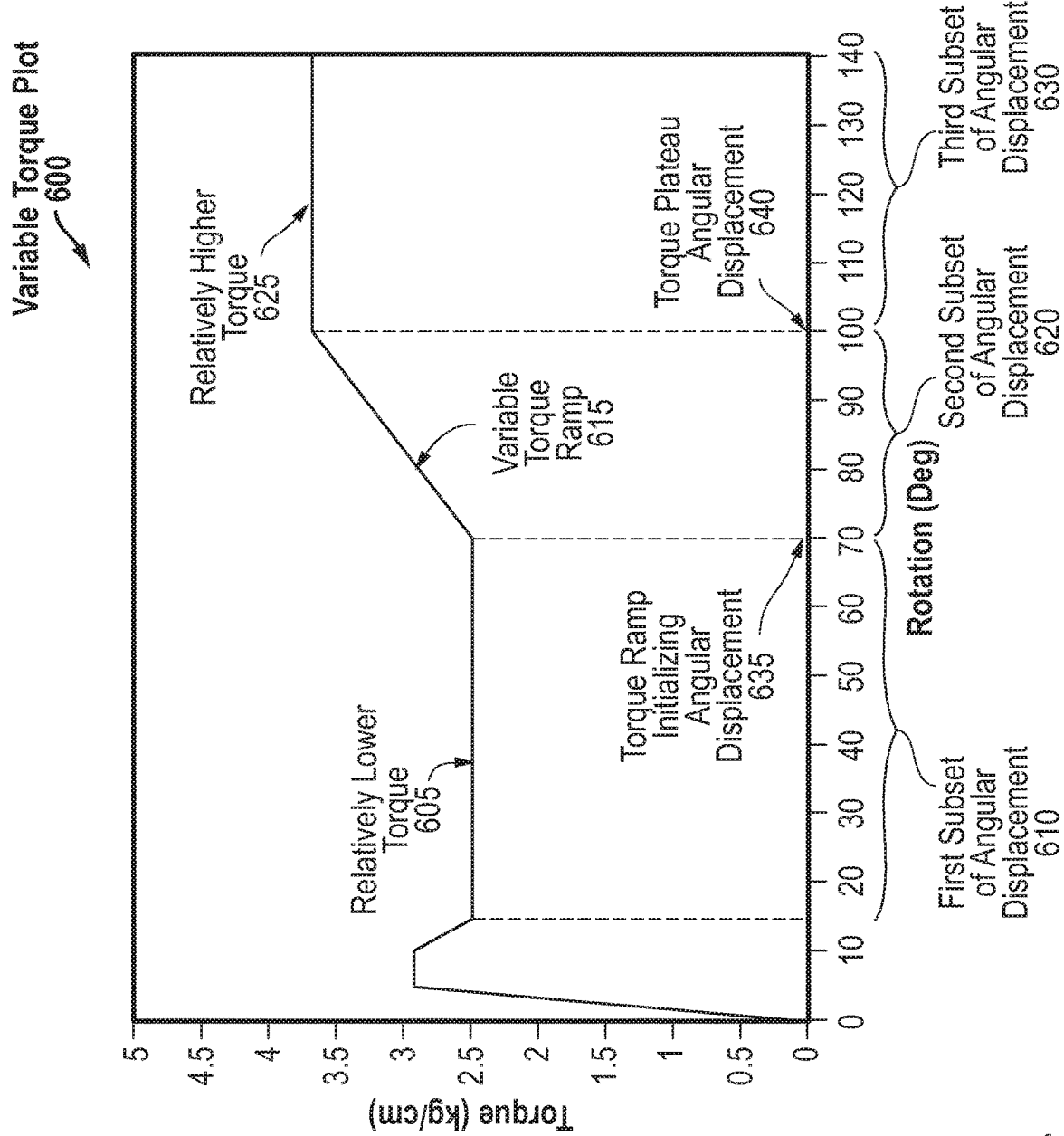
FIG. 6 is a plot illustrating a variable resistive torque of a variable torque three-joint hinge according to an embodiment of the present disclosure.

FIG. 6 is a plot illustrating a variable resistive torque on opening of a variable torque three-joint hinge according to an embodiment of the present disclosure. As described herein, the combination of the resistive torques generated by the constant torque opening joint and the variable torque opening joint throughout the angular displacement between the base chassis and the display chassis in an embodiment may provide different resistive torques for specific subsets of rotational ranges, thus meeting each of the above-described design requirements for opening torque for a laptop information handling system. For example, as indicated in variable torque plot 600, the combined resistive torques may include a constant, relatively lower resistive torque 605 over a first subset of angular displacement 610, a variable-torque ramp 615 over which the combined resistive torque steadily increases over a second subset of angular displacement 620, and another constant, relatively higher resistive torque 625 over a third subset of angular displacement 630.

The constant, relatively lower combined opening resistive torque 605 in an embodiment may correspond to a first subset of angular displacement 610 over which the exterior surface of the shaft protrusion does not come into contact with the interior surface of the variable torque joint. In such an embodiment, the variable torque opening joint may apply little or no resistive torque, and the relatively lower resistive torque 605 may be caused entirely or in large part by the constant torque opening joint. For example, the constant torque opening joint may supply a constant resistive torque of roughly 2.5 kg-cm over an angular displacement of roughly 15-70 degrees. In other embodiments, the magnitude of resistive torque supplied over this first subset of angular displacement 610 may greater or less than 2.5 kg-cm, and may be preset by combining the resistive torque supplied by the variable torque joint with resistive torques supplied by other constant torque opening joints designed to provide either more or less resistive torque.

In an embodiment, the variable torque ramp 615 may correspond to a second subset of angular displacement 620 over which an increasing portion of the shaft protrusion exterior surface comes into contact with the interior surface of the variable torque joint. As described herein, in embodiments in which the shaft includes an exterior protrusion as described with reference to FIGS. 5A-5D, the leading edge of the shaft protrusion may begin to make contact with the inner surface of the variable torque opening joint when the shaft has been rotated to an angular displacement equivalent to a torque ramp initializing angular displacement 635 (e.g., 70 degrees). As the shaft rotates beyond the torque ramp initializing angular displacement 635, an increasing amount of the surface area of the shaft protrusion may come into contact with the interior surface of the variable torque opening joint, increasing friction or deformation of the variable torque opening joint, and causing the variable torque opening joint to apply an increasing magnitude of resistive torque.

The variable torque ramp 615 may end once the entire exterior surface of the shaft protrusion comes into contact with the interior surface of the variable torque joint. This may occur when the shaft is rotated to an angular displacement equivalent to the torque plateau angular displacement 640 (e.g., 110 degrees). The portion of the shaft protrusion outer surface that is in contact with the interior surface of the variable torque opening joint in such an embodiment may increase as the shaft rotates throughout the second subset of angular displacement 620, until it reaches the torque plateau angular displacement 640. Because the entire surface of the shaft protrusion may be in contact with the interior surface of the variable torque opening joint when the shaft is rotated into the third subset of angular displacement 630, the interference between the shaft protrusion and variable torque opening joint may reach a plateau at this point. The friction between the outer surface of the shaft protrusion and the interior surface of the variable torque joint, and correspondingly generated resistive torque may increase from the relatively lower resistive torque 605 to the relatively higher resistive torque 625 over the second subset of angular displacement 620, as such an increase in contact, friction, or deformation occurs. The constant, relatively higher combined opening resistive torque 625, which must be overcome in order to open the laptop information handling system in an embodiment may correspond to a third subset of angular displacement 630 over which the entire exterior surface of the shaft protrusion remains in contact with the interior surface of the variable torque joint. Thus, the resistive torque applied by the variable torque opening joint may reach a relatively constant magnitude plateau when the shaft is rotated up to and beyond the third subset of angular displacement 630 in an embodiment.

This plateaued resistive torque applied by the variable torque opening joint over the third subset of angular displacement 630 may be combined with the constant resistive torque supplied by the constant torque opening joint to give the relatively higher torque 625. For example, the constant resistive torque of roughly 2.5 kg-cm supplied by the constant torque opening joint may be combined with the maximum variable resistive torque supplied by the variable torque joint to give a relatively higher resistive torque 625 of roughly 3.75 kg-cm beginning at an angular displacement of roughly 100 degrees. In other embodiments, the magnitude of resistive torque supplied over this third subset of angular displacement 630 may greater or less than 3.75 kg-cm, and may be determined by combining the resistive torque applied by the variable torque joint with resistive torques applied by other constant torque opening joints designed to provide either more or less resistive torque, or by increasing or decreasing the maximum allowable resistive torque supplied by the variable torque joint. Further, the angular rotation ranges 610, 620, and 630 may vary in embodiments depending on neutral position of the shaft, location of the protrusion along the cross-sectional circumference of the shaft, and the variable torque joint dimensions.

Figure 7:
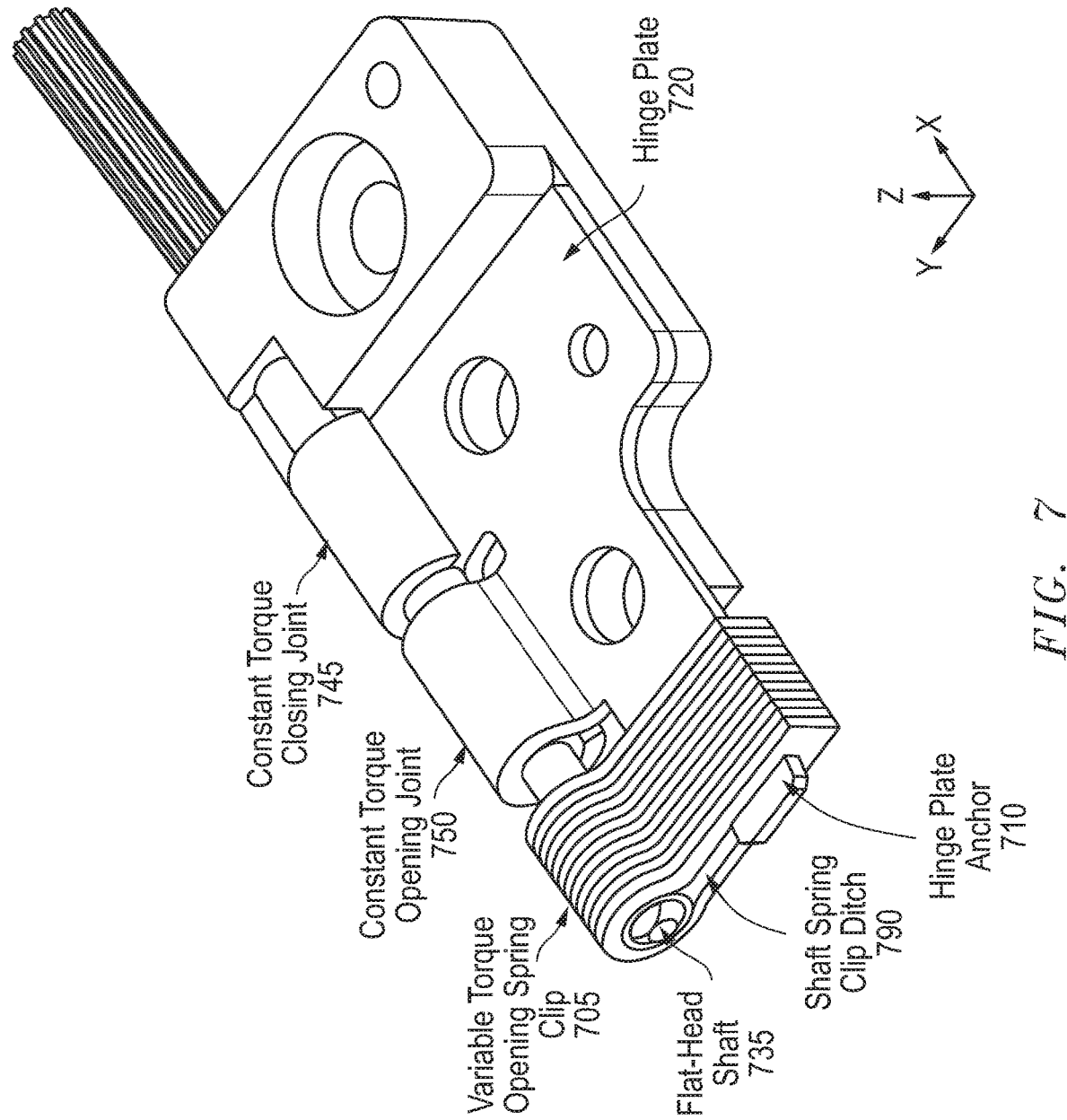
FIG. 7 is a graphical perspective-view of a variable torque three joint hinge including a variable torque opening spring-loaded clip according to an embodiment of the present disclosure.

FIG. 7 is a graphical perspective-view of a variable torque three joint hinge including a constant torque opening joint, a constant torque closing joint, and a variable torque opening spring-loaded clip according to an embodiment of the present disclosure. As described herein, the variable torque joint in some embodiments may comprise a friction joint, such as a question-mark clip. In other embodiments, as illustrated in FIG. 7, the variable torque joint may comprise a spring-loaded clip 705. Such a variable torque opening spring-clip 705 in an embodiment may comprise an opening through which the shaft 735 may be inserted.

Unlike the question-mark clips described herein, the variable torque opening spring-clip 705 may completely enclose the cross-sectional circumference of the shaft 735. In an embodiment, the shaft 735 may have a non-circular cross-sectional shape, with a minimum cross-sectional width and a maximum cross-sectional width. The minimum cross-sectional width of the shaft 735 in an embodiment may be lesser than the interior diameter of the variable torque opening spring-clip 705. The maximum cross-sectional width of the shaft 735 in an embodiment may be greater than the interior diameter of the variable torque opening spring-clip 705. When the shaft 735 rotates within the variable torque opening spring-clip 705 to certain angular displacements, the variable torque opening spring-clip 705 may undergo deformation to accommodate passage of the maximum cross-sectional width within the interior surface of the variable torque opening spring-clip 705, as described in greater detail below with reference to FIGS. 8A-8B. The material comprising the variable torque opening spring-clip 705 in such an embodiment may be resistant to such deformation, thus generating torque resistive to rotation of the shaft 735. The degree of such resistance in an embodiment may depend upon the rigidity of the variable torque opening spring-clip material, as well as the dimensions of the opening within the variable torque opening spring-clip 705 through which the shaft 735 is disposed. The magnitude of resistive torque supplied by the variable torque opening spring-clip 705 in such a manner may increase as the deformation caused by rotation of the shaft 735 increases in an embodiment.

Similarly to the question-mark clips described herein, the variable torque opening spring-clip 705 may comprise a plurality of machine-pressed spring-clip plates. Each of such spring-clip plates may have an opening disposed throughout the thickness (in the X direction) of their shafts, which may be aligned with one another, stacked, and bonded together to form the variable torque opening spring-clip 705. The hinge plate anchor 710 may be inserted through the shaft openings formed in each of the plurality of stacked spring clip plates forming the variable torque opening spring-clip 705, and may be additionally bonded, glued, screwed, or otherwise fixedly attached to the variable torque opening spring clip 705. Similarly, in some embodiments, the plurality of stacked spring-clip plates may also be bonded, glued, screwed, or otherwise fixedly attached to one another. The hinge plate 720 and variable torque opening spring clip 705 in such an embodiment may be comprised of the same or differing materials. In other embodiments, the variable torque opening spring-clip 705 may be formed as part of a continuous, solid part that also includes the hinge plate 720, constant torque opening joint 750, and constant torque closing joint 745.

Figure 8A:
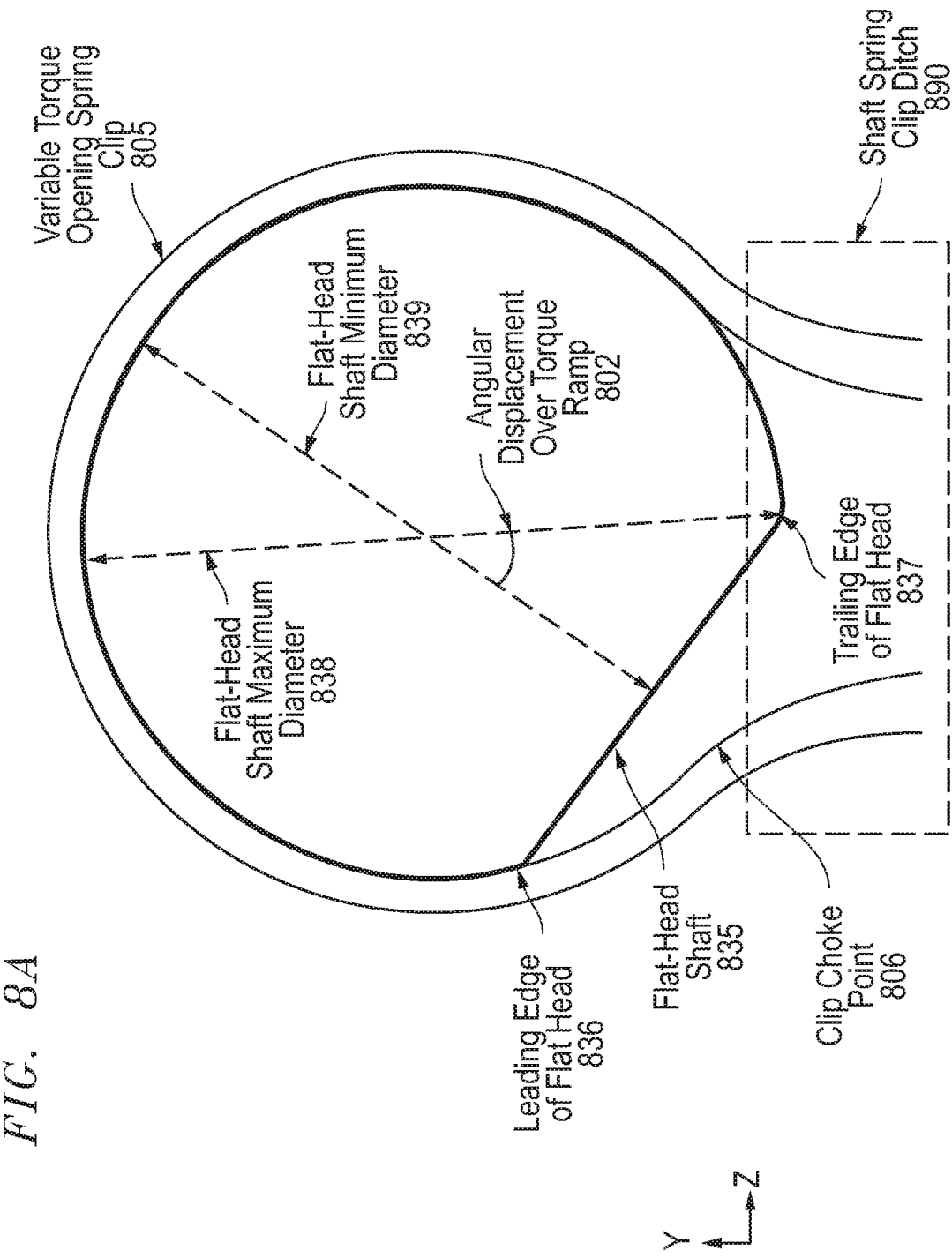
FIG. 8A is a graphical cross-sectional view of a hinge shaft at a first angular displacement according to an embodiment of the present disclosure.

FIG. 8A is a graphical cross-sectional view of a hinge shaft having a non-circular cross-section at a first angular displacement with respect to a variable torque opening spring-clip associated with a minimum variable torque according to an embodiment of the present disclosure. As described herein, a shaft 835 may have a non-circular cross-sectional shape, with a minimum cross-sectional width and a maximum cross-sectional width. For example, the shaft 835 may comprise a circular shaft with a portion removed, along its axial length to form a shaft having a flat-head cross-sectional shape. Removal of such a portion along the axial length of such a circular shaft may form a flat-head having a cross-sectional shape that includes a leading edge 836 and a trailing edge 837. The cross-sectional shape of the flat-head shaft 835 in an embodiment may have a maximum diameter 838, measuring from the trailing edge 837 to the opposite cross-sectional side of the shaft 835. The flat-head shaft 835 may also have a cross-sectional minimum diameter 839, measuring perpendicularly from the midpoint between the leading edge 836 and the trailing edge 837 to the opposite side of the flat-head shaft 835.

The variable torque opening spring clip 805 may include a clip choke point 806, where the shaft spring clip ditch 890 terminates, and the substantially circular portion of the variable torque opening spring clip 805 begins. As described herein, the flat-head shaft may have a maximum diameter 838 greater than the interior diameter of the variable torque opening spring clip 805, and minimum diameter 839 lesser than the interior diameter of the variable torque opening spring clip 805 in an embodiment. In order to accommodate entry of the shaft 835 within the substantially circular portion, the variable torque opening spring clip 805 may deform slightly, causing slight movement at the clip choke point 806. For example, rotation of the maximum diameter 838 portion of the flat-head shaft 835 past the clip choke point 806 and toward the interior of the variable torque opening spring clip 805 in an embodiment may cause slight deformation in the shape of the variable torque opening spring clip 805, and movement of the clip choke point 806. Such contact between the clip choke point 806 and the maximum diameter 838 portion of the shaft 835 in an embodiment may have a cam-like effect on the position of the clip choke point 806. The variable torque opening spring clip 805 may correspondingly exert a torque resistive to such rotation in an embodiment, as the material of the variable torque opening spring clip 805 tends back toward its original shape.

The variable torque opening spring clip 805 in an embodiment may exert little or not resistive torque in an embodiment when the minimum diameter 839 portion of the flat-head shaft 835 is in-line with the clip choke point 806, as depicted in FIG. 8A. Thus, the resistive torque applied by the variable torque opening spring clip 805 may be at a minimum when the minim diameter 839 portion of the shaft 835 is in-line with the clip choke point 806, and at a maximum when the maximum diameter 838 portion of the shaft 835 is in-line with the clip choke point 806 in an embodiment.

Figure 8B:
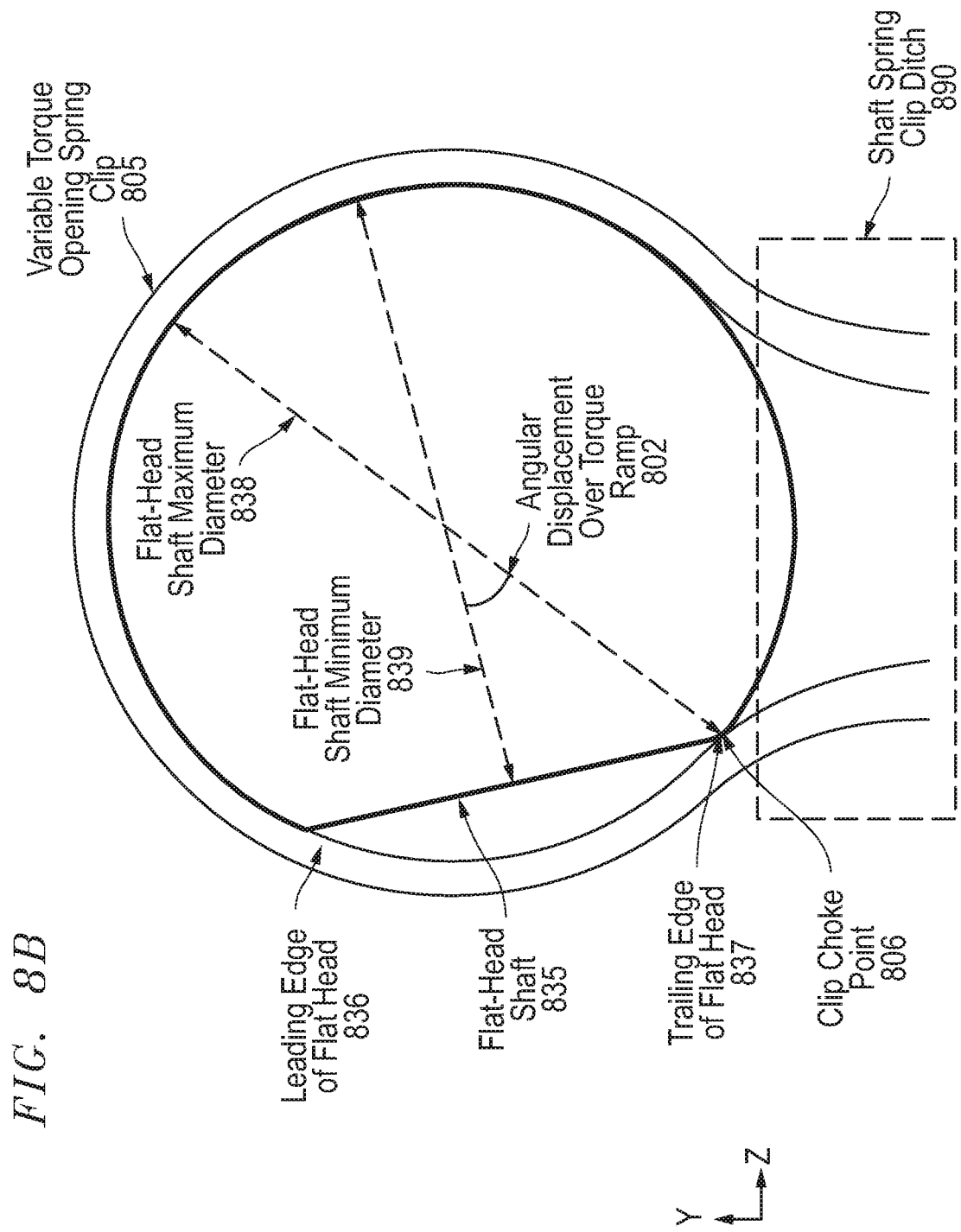
FIG. 8B is a graphical cross-sectional view of a hinge shaft at a second angular displacement according to an embodiment of the present disclosure.

FIG. 8B is a graphical cross-sectional view of a hinge shaft having a non-circular cross-section at a second angular displacement with respect to a variable torque opening spring-clip associated with a maximum variable torque according to an embodiment of the present disclosure. As described herein, contact between the clip choke point 806 and the maximum diameter 838 portion of the shaft 835 in an embodiment may have a cam-like effect on the position of the clip choke point 806. The variable torque opening spring clip 805 in an embodiment may exert a maximum resistive torque in an embodiment when the maximum diameter 838 portion of the flat-head shaft 835 is in-line with the clip choke point 806, as depicted in FIG. 8B. The angle 802 between the maximum diameter 838 and the minimum diameter 839 in an embodiment may be equivalent to the angular displacement over the torque ramp extending between the minimum resistive torque applied by the variable torque opening spring clip 805 and the maximum resistive torque. Thus, the cross-sectional shape of the flat-head shaft 835 in an embodiment may be designed in order to accommodate a preset torque ramp angular displacement based on design specifications. For example, in an embodiment in which design specifications set the angular displacement over the torque ramp at 40 degrees (e.g., between 70 degrees and 110 degrees from a neutral position), the angle 802 between the maximum diameter 838 and minimum diameter 839 may measure 40 degrees, as depicted in FIG. 8A. In another example embodiment in which design specifications set the angular displacement over the torque ramp at 20 degrees (e.g., between 70 and 90 degrees from a neutral position), the angle 802 may measure 20 degrees. In such a way, the flat-head shaft 835 in an embodiment may be machined or otherwise produced according to preset design specifications dictating the angular displacement over which resistive torque applied by the variable torque opening spring clip 805 may increase from a minimum to a maximum.

Figure 9:
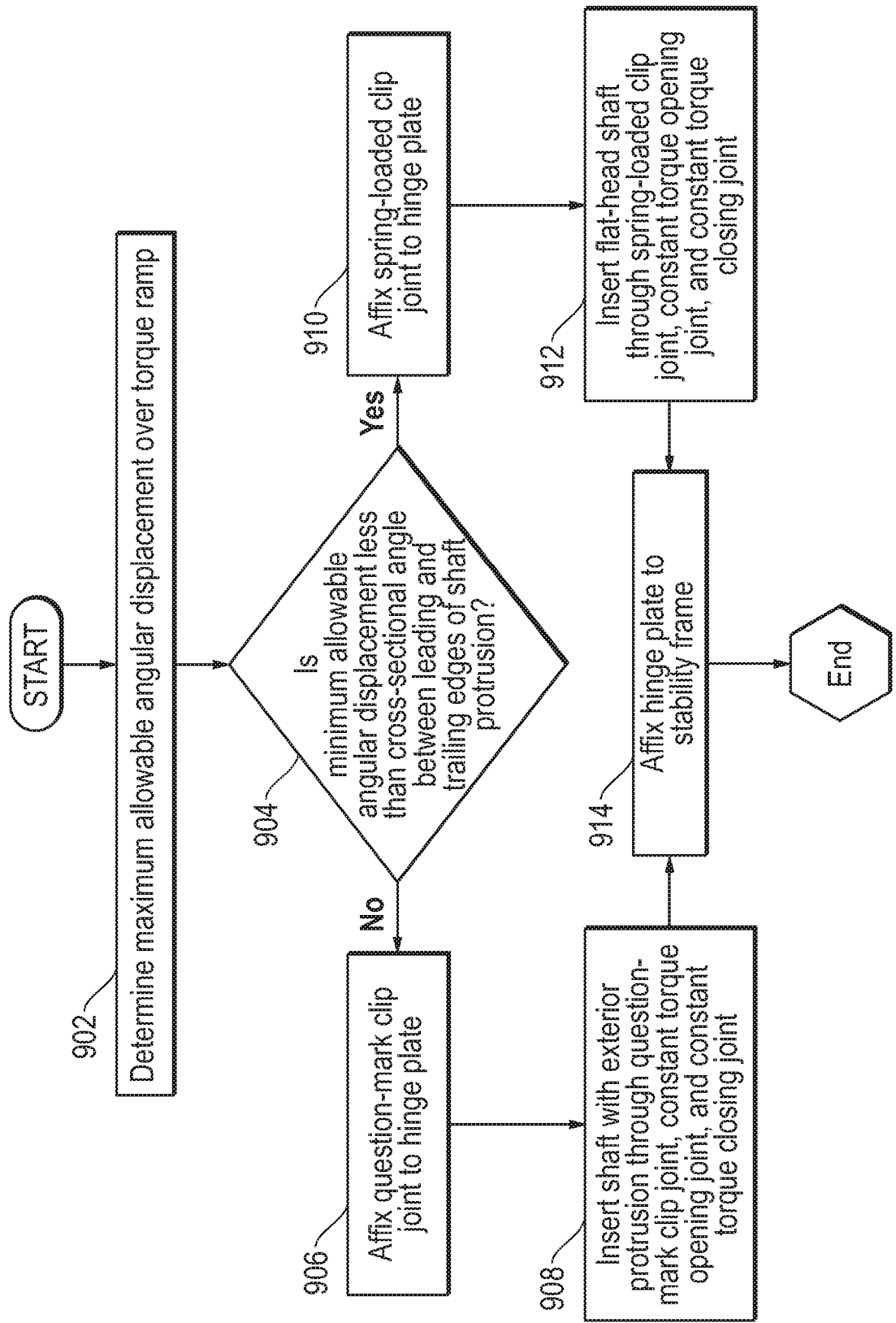
FIG. 9 is a flow diagram illustrating a method of fabricating a variable torque hinge meeting preset design requirements according to an embodiment of the present disclosure.

FIG. 9 is a flow diagram illustrating a method of affixing a variable torque hinge meeting preset design requirements to a hinge plate according to an embodiment of the present disclosure. As described herein, current design requirements include a hinge operably connecting a display chassis and base chassis applying a resistive torque that varies as the display chassis rotates with respect to the display chassis. For example, design requirements may include a one-handed opening ability that requires a relatively low resistive torque within a first subset of the allowable rotation range between the display chassis and the base chassis. As another example, design requirements may include limitation or near elimination of play or wobble of both the display chassis and the base chassis with respect to one another, requiring a relatively higher resistive torque within a second subset of the allowable rotation range, when the display chassis may be most likely to wobble. Embodiments of the present disclosure include a plurality of variable torque joints that, in combination with a constant torque joint may apply a relatively lower resistive torque in a first subset of angular displacements, and a relatively higher resistive torque in a second subset of angular displacements. However, each of the embodiments described herein may apply varying magnitudes of torque over varying ranges of angular displacement. The process illustrated by FIG. 9 describes a method for selecting from the plurality of embodiments described herein, based on design requirements.

At block 902, a maximum allowable angular displacement over a torque ramp may be determined in an embodiment. The torque ramp in an embodiment may describe the angular displacement over which the resistive torque for a three-joint variable torque hinge may increase from a minimum value to a maximum value. For example, in an embodiment described with reference to FIG. 6, the combined resistive torques applied by the variable torque opening joint and the constant torque opening joint may include a constant, relatively lower torque 605 over a first subset of angular displacement 610, a variable-torque ramp 615 over which the combined torque steadily increases over a second subset of angular displacement 620, and another constant, relatively higher torque 625 over a third subset of angular displacement 630. In an embodiment, the variable torque ramp 615 may correspond to a second subset of angular displacement 620 over which an increasing proportion of the exterior surface area of a shaft comes into contact with the interior surface of the variable torque joint.

Design requirements may dictate or influence optimal angular displacement over which the variable-torque ramp 615 occurs in an embodiment. For example, in an embodiment in which design requirements include a one-handed opening capability, the three-joint hinge may require a relatively lower torque 605 throughout the subset of angular displacements between the base chassis and the displace chassis in which a relatively higher resistive torque would require the use of two hands. In one example embodiment, it may be determined for a specific model of information handling system chassis (including both the base chassis and display chassis), that the three joint hinge apply the relatively lower resistive torque 605 while the base chassis is situated at angles between 20 and 70 degrees with respect to the display chassis in order for the user to perform a one-handed opening. In such an embodiment, the second range of angular displacements 620 over which the variable torque ramp 615 extends may begin at 70 degrees. In other embodiments, other ranges of angular displacement (e.g., other than between 20 and 70 degrees) may be identified, or other design requirements (e.g., other than one-handed opening capability) may dictate or influence the identification of such a range of angular displacement.

As another example, in an embodiment in which design requirements include limited or no wobble of the base chassis or display chassis, the three-joint hinge may require a relatively higher torque 625 throughout the subset of angular displacements in which a relatively lower resistive torque would allow for undesirable play or wobble of the base chassis or display chassis with respect to one another. In one example embodiment, it may be determined for a specific model of information handling system chassis that the three-joint hinge apply the relatively higher resistive torque 625 while the base chassis is situated at angles between 110 and 140 degrees with respect to the display chassis in order to inhibit such play or wobble. In other embodiments, it may be determined the relatively higher torque 625 should engage at lower angular displacements, such as 95 degrees or 90 degrees in order to inhibit such wobble. In still other embodiments, design requirements other than wobble prevention may inform the angular displacement at which the relatively higher torque 625 should apply. The angular displacement at which the relatively higher torque 625 may apply in an embodiment may define the angular displacement at which the variable torque ramp 615 ends, and the maximum allowable angular displacement over the variable torque ramp.

It may be determined in an embodiment at block 904 whether the maximum allowable angular displacement of the variable torque ramp is less than the cross-sectional angle between the leading and trailing edges of a shaft protrusion. As described herein, in embodiments in which a shaft with a protrusion is inserted within a question-mark clip variable torque joint, at a certain angular displacement, the outer surface of the shaft protrusion may begin to make contact with the inner surface of the variable torque opening joint. The variable torque ramp 615 in such an embodiment may begin just as the leading edge of the shaft protrusion comes into contact with the interior surface of the variable torque joint, and end once the entire exterior surface of the shaft protrusion comes into contact with the interior surface of the variable torque joint. Consequently, the second subset of angular displacements 620 over which the variable torque ramp 615 occurs in such an embodiment may be equivalent to the angle between the leading and trailing edges of the shaft protrusion. For example, in an embodiment described with reference to FIG. 5C, the second subset of angular displacements over which the variable torque ramp occurs may be equivalent to the angle between the leading edge 512 and trailing edge 513 of the shaft protrusion 510. In other words, a wider shaft protrusion may be associated with a torque ramp extending over a wider range of angular displacement, and a narrower shaft protrusion may be associated with a torque ramp extending over a more narrow range of angular displacement.

In other embodiments in which a flat-head shaft is inserted within a spring-clip variable torque joint, a portion of an otherwise circular shaft may be removed to form a flat-head shaft. This may be in contrast to the additive procedure in which a shaft protrusion may be added to an otherwise circular shaft, as described directly above. Using the subtractive method to form the flat-head shaft in an embodiment may result in a flat-head shaft having a cross-sectional shape that includes a flat portion having a leading edge and a trailing edge. For example, in an embodiment described with reference to FIG. 8B, the leading edge 836 and trailing edge 837 in such an embodiment may be separated from one another by an angle equivalent to twice the angular displacement 802 over the torque ramp preset according to design specifications. In such an embodiment, design requirements specifying a greater range of angular displacement over the torque ramp may result in a leading edge 836 and trailing edge 837 situated further away from one another (e.g., larger angle between the two), and a smaller range of angular displacement over the torque ramp may result in a leading edge 836 and trailing edge 837 situated more closely to one another (e.g., smaller angle between the two).

In order to meet design requirements according to various embodiments described herein involving smaller angular displacements over the torque ramp, a relatively narrow protrusion may be added to the exterior surface of an otherwise circular shaft, or a relatively smaller portion of an otherwise circular shaft may be removed from the axial length of that shaft to form a flat-head shaft. Decreasing the width of an added protrusion in an embodiment in such a way, or beyond certain threshold dimensional tolerances may compromise the structural rigidity or durability of such a protrusion. In contrast, decreasing the size of the portion removed from an otherwise circular shaft to form a flat-head shaft may not be associated with such compromised functionality. Thus, if the angular displacement over the torque ramp preset according to design specifications would require a protrusion having a width falling below threshold dimensional tolerances, a flat-head shaft may be employed instead. If the minimum allowable angular displacement over the torque ramp is not less than the cross-sectional angle between the leading and trailing edges of the shaft protrusion according to threshold dimensional tolerances for the protrusion, the method may proceed to block 906 for selection of a question-mark clip joint and a shaft with a protrusion. If the minimum allowable angular displacement over the torque ramp is less than the cross-sectional angle between the leading and trailing edges of the shaft protrusion according to threshold dimensional tolerances for the protrusion, the method may proceed to block 910 for selection of a spring-loaded clip joint and a flat-head shaft.

At block 906, a question-mark clip joint may be affixed to a hinge plate in an embodiment. For example, in an embodiment described with reference to FIG. 4A, a two-joint hinge may be supplemented with the variable-torque opening joint 405 that may include a question-mark clip. The variable torque opening joint 405 may be located between the constant torque closing joint 445 and the constant torque opening joint 450, or may be located adjacent to the stability frame top surface 425, or adjacent to the leading edge of shaft 435. In some embodiments, the variable torque opening joint 405 may be added to the constant torque joints 450 and 445 by fabricating the hinge plate 420 to comprise all three of joints 405, 445, and 450. In other words, the hinge plate 420, variable torque joint 405, constant torque opening joint 450, and constant torque closing joint 445 in such an embodiment may be fabricated from a single, solid, and continuous material.

A shaft with an exterior protrusion may be inserted through the question-mark clip joint, constant torque opening joint, and constant torque closing joint in an embodiment at block 908. For example, in an embodiment described with reference to FIG. 5A, the shaft 535 having protrusion 510 may be inserted through the constant torque closing joint 545, the constant torque opening joint 550, and the variable torque opening joint 505. As the shaft 535 rotates in a counterclockwise direction with respect to the constant torque closing joint 545, the constant torque closing joint 545 may apply a constant torque resistive to rotation of the display chassis toward the base chassis (e.g., into a closed configuration) of an information handling system. As the shaft 535 rotates in a clockwise direction with respect to the constant torque opening joint 550, the constant torque opening joint 550 may apply a constant torque resistive to rotation of the display chassis away from the base chassis (e.g., into an open configuration) of an information handling system. As the shaft 535 rotates in a clockwise direction with respect to the variable torque opening joint 505, the shaft protrusion 510 may come into contact with the interior surface of the variable torque opening joint 505 over a subset of angular displacements. This may cause the variable torque opening joint 505 to apply an increasing magnitude of torque resistive to rotation of the display chassis away from the base chassis (e.g., into an open configuration) of an information handling system throughout a subset of such a rotation.

At block 910, a spring-loaded clip joint may be affixed to a hinge plate in an embodiment. For example, in an embodiment described with reference to FIG. 7, a two-joint hinge may be supplemented with the variable-torque opening joint 705 that may include a spring-loaded clip. The variable torque opening spring-clip 705 may completely enclose the cross-sectional circumference of the shaft 735, and may deform in order to accommodate rotation of the shaft 735 within. The material comprising the variable torque opening spring-clip 705 in such an embodiment may be resistant to such deformation, thus generating torque resistive to rotation of the shaft 735. The degree of such resistance in an embodiment may depend upon the rigidity of the variable torque opening spring-clip material, as well as the dimensions of the opening within the variable torque opening spring-clip 705 through which the shaft 735 is disposed. The magnitude of resistive torque supplied by the variable torque opening spring-clip 705 in such a manner may increase as the deformation caused by rotation of the shaft 735 increases in an embodiment.

A hinge plate anchor 710 may be inserted through shaft openings formed in each of a plurality of stacked spring clip plates forming the variable torque opening spring-clip 705, and may be additionally bonded, glued, screwed, or otherwise fixedly attached to the variable torque opening spring clip 705. Similarly, in some embodiments, the plurality of stacked spring-clip plates may also be bonded, glued, screwed, or otherwise fixedly attached to one another. The hinge plate 720 and variable torque opening spring clip 705 in such an embodiment may be comprised of the same or differing materials. In other embodiments, the variable torque opening spring-clip 705 may be formed as part of a continuous, solid part that also includes the hinge plate 720, constant torque opening joint 750, and constant torque closing joint 745.

A flat-head shaft may be inserted through the spring-loaded clip joint, constant torque opening joint, and constant torque closing joint in an embodiment at block 912. For example, in an embodiment described with reference to FIG. 7, the flat-head shaft 735 may be inserted through the constant torque closing joint 745, the constant torque opening joint 750, and the variable torque opening joint 705. As the shaft 735 rotates in a counterclockwise direction with respect to the constant torque closing joint 745, the constant torque closing joint 745 may apply a constant torque resistive to rotation of the display chassis toward the base chassis (e.g., into a closed configuration) of an information handling system. As the shaft 735 rotates in a clockwise direction with respect to the constant torque opening joint 750, the constant torque opening joint 750 may apply a constant torque resistive to rotation of the display chassis away from the base chassis (e.g., into an open configuration) of an information handling system.

The shaft 735 in such an embodiment may have a non-circular cross-sectional shape, with a minimum cross-sectional width and a maximum cross-sectional width. The minimum cross-sectional width of the shaft 735 in an embodiment may be lesser than the interior diameter of the variable torque opening spring-clip 705, and the maximum cross-sectional width of the shaft 735 in an embodiment may be greater than the interior diameter of the variable torque opening spring-clip 705. When the shaft 735 rotates within the variable torque opening spring-clip 705 to certain angular displacements, the variable torque opening spring-clip 705 may undergo deformation to accommodate passage of the maximum cross-sectional width within the interior surface of the variable torque opening spring-clip 705. The tendency of the variable torque opening spring-clip 705 material to return to its non-deformed shape may result in application of torque resistive to such rotation of the shaft 735 at certain angular displacements. Thus, the variable torque opening joint 705 in such an embodiment may apply an increasing magnitude of torque resistive to rotation of the display chassis away from the base chassis (e.g., into an open configuration) of an information handling system throughout a subset of such a rotation.

At block 910, the hinge plate may be affixed to the stability frame in an embodiment. For example, in an embodiment described with reference to FIG. 2, the base chassis hinge plate 220 may be affixed to the stability frame bottom surface 230 through various known mechanisms, such as screws, adhesives, or clamps. In some embodiments the variable torque opening joint 255 may comprise a question-mark clip, and the shaft 235 may comprise a shaft with a protrusion. In other embodiments, the variable torque opening joint 255 may comprise a spring-loaded clip, and the shaft 235 may comprise a flat-head shaft. According to various embodiments herein, the variable torque opening joint 255 may operate to apply an increasing magnitude of torque resistive to rotation of the display housing 205 away from the base housing 260 (e.g., into an open configuration) of the information handling system, according to preset design specifications. The method may then end.

The blocks of the flow diagram of FIG. 9 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A variable torque opening hinge joint for chasses of an information handling system comprising:
   a shaft operably connecting to a display chassis;
   the shaft inserted through a first hinge joint and a second hinge joint;
   a hinge plate operably connecting the first hinge joint and the second hinge joint to a base chassis;

the shaft having a protrusion along its axial length;
the first hinge joint applying a constant torque resistive to a rotation of the shaft throughout a range of angular displacement based on the shape of the shaft rotating within the first hinge joint;
the second hinge joint applying a variable torque resistive to a rotation of the shaft that increases from a minimum variable resistive torque to a maximum variable resistive torque over a preset subset of the range of angular displacement to reach a maximum variable torque based on the shape of the shaft with the protrusion rotating within and interfacing with the second hinge joint; and
a leading edge of the protrusion and a trailing edge of the protrusion separated by an angle relative of the base chassis to the display chasses equivalent to the preset subset of the range of angular displacement.

2. The information handling system of claim 1 further comprising:
the shaft inserted through a third hinge joint applying a constant resistive torque in coordination with the constant torque resistive to a rotation of the shaft of the first hinge joint.

3. The information handling system of claim 1, wherein the second hinge joint comprises a friction joint.

4. The information handling system of claim 1, wherein the second hinge joint comprises a question-mark clip fixedly attached to the hinge plate.

5. The information handling system of claim 4, wherein the question-mark clip comprises a plurality of machine-stamped plates fixedly attached to one another.

6. The information handling system of claim 1, wherein a combined magnitude of the constant torque resistive to the rotation of the shaft and the minimum variable resistive torque is less than an amount of torque that would lift the base chassis from a flat surface when force is applied to the display chassis to move the display chassis relative to the base chassis.

7. The information handling system of claim 1, wherein a combined magnitude of the constant torque resistive to the rotation of the shaft and the maximum variable resistive torque is sufficient to limit resistive torque for rotation of the display chassis with respect to the base chassis according to a preset level of maximum resistive torque.

8. A variable torque opening hinge joint for chasses of an information handling system comprising:
a shaft operably connecting to a display chassis;
the shaft inserted through a first hinge joint and a second hinge joint;
a hinge plate operably connecting the first hinge joint and the second hinge joint to a base chassis;
the shaft having a flat surface along its axial length;
the first hinge joint applying a constant torque resistive to a rotation of the shaft throughout a range of angular displacement based on the shape of the shaft rotating within the first hinge joint;
the second hinge joint applying a variable torque resistive to a rotation of the shaft that increases from a minimum variable resistive torque to a maximum variable resistive torque over a preset subset of the range of angular displacement to reach a maximum variable torque based on the shape of the shaft with the flat surface rotating within and interfacing with the second hinge joint; and
a leading edge of the flat surface and a trailing edge of the flat surface separated by an angle relative of the base chassis to the display chasses equivalent to twice the preset subset of the range of angular displacement.

9. The information handling system of claim 8 further comprising:
the shaft inserted through a third hinge joint applying a constant resistive torque in a hinge rotational direction opposite to a hinge rotation direction constant resistive torque of the first hinge joint.

10. The information handling system of claim 8, wherein the second hinge joint comprises a friction joint.

11. The information handling system of claim 8, wherein the second hinge joint comprises a spring-loaded clip fixedly attached to the hinge plate.

12. The information handling system of claim 11, wherein the spring-loaded clip comprises a plurality of machine-stamped plates fixedly attached to one another.

13. The information handling system of claim 8, wherein a combined magnitude of the constant torque resistive to the rotation of the shaft and the minimum variable resistive torque is less than an amount of torque that would lift the base chassis from a flat surface when force is applied to the display chassis to move the display chassis relative to the base chassis.

14. The information handling system of claim 8, wherein a combined magnitude of the constant torque resistive to the rotation of the shaft and the maximum variable resistive torque is sufficient to limit resistive torque for rotation of the display chassis with respect to the base chassis according to preset level of maximum resistive torque.

15. A method of fabricating a variable torque opening hinge joint for chasses of an information handling system comprising:
fabricating a shaft having a flat surface along its axial length to form a leading edge of the flat surface and a trailing edge of the flat surface separated by a preset angle;
inserting the shaft through a first hinge joint applying a constant torque resistive to a rotation of the shaft throughout a range of angular displacement within the first hinge joint based on the shape of the shaft at the first hinge joint;
inserting the shaft through a second hinge joint applying a variable torque resistive to a rotation of the shaft that increases from a minimum variable resistive torque to a maximum variable resistive torque over a preset subset of the range of angular displacement equivalent to the preset angle relative of the base chassis to the display chasses to reach a maximum variable torque based on the shape of the shaft with the flat surface rotating within and interfacing with the second hinge joint;
inserting the shaft through a third hinge joint applying a constant resistive torque based on the shape of the shaft rotating within the third hinge joint;
operably connecting the first hinge joint and the second hinge joint to a base chassis hinge plate operably attached to a base chassis; and
operably connecting the shaft to a display chassis hinge plate operably attached to a display chassis.

16. The method of claim 15, wherein the hinge plate, first hinge joint, and second hinge joint are formed from a single, continuous material.

17. The method of claim 15, wherein the second hinge joint comprises a spring-loaded clip fixedly attached to the hinge plate.

18. The method of claim 17 further comprising:
machine-stamping a plurality of plates;

fixedly attaching the plurality of plates to one another to form the spring-loaded clip.

19. The method of claim 15, wherein a combined magnitude of the constant torque resistive to the rotation of the shaft and the minimum variable resistive torque is less than an amount of torque that would lift the base chassis from a flat surface when force is applied to the display chassis to move the display chassis relative to the base chassis.

20. The method of claim 15, wherein a combined magnitude of the constant torque resistive to the rotation of the shaft and the maximum variable resistive torque is sufficient to limit resistive torque for rotation of the display chassis with respect to the base chassis according to preset level of maximum resistive torque.

* * * * *